US010853752B2

(12) United States Patent
Bayges

(10) Patent No.: US 10,853,752 B2
(45) Date of Patent: Dec. 1, 2020

(54) POLE NETWORK

(71) Applicant: Bryan Bayges, Royersford, PA (US)

(72) Inventor: Bryan Bayges, Royersford, PA (US)

( * ) Notice: Subject to any disclaimer, the term of this patent is extended or adjusted under 35 U.S.C. 154(b) by 0 days.

(21) Appl. No.: 16/600,445

(22) Filed: Oct. 11, 2019

(65) Prior Publication Data

US 2020/0118054 A1 Apr. 16, 2020

Related U.S. Application Data

(60) Provisional application No. 62/744,639, filed on Oct. 11, 2018.

(51) Int. Cl.
| G06Q 10/06 | (2012.01) |
| H02J 3/00 | (2006.01) |
| H02J 3/28 | (2006.01) |
| H04B 17/318 | (2015.01) |
| H04W 4/44 | (2018.01) |
| G05D 1/00 | (2006.01) |
| E04H 12/00 | (2006.01) |
| G06Q 50/06 | (2012.01) |

(52) U.S. Cl.
CPC ..... *G06Q 10/06315* (2013.01); *G05D 1/0088* (2013.01); *H02J 3/003* (2020.01); *H02J 3/28* (2013.01); *H04B 17/318* (2015.01); *H04W 4/44* (2018.02); *E04H 12/003* (2013.01); *G06Q 50/06* (2013.01); *H02J 2300/22* (2020.01); *H02J 2300/28* (2020.01)

(58) Field of Classification Search
CPC .......... H04B 17/00; H04B 17/15–18; H04B 17/318; H02J 2203/00–10; H02J 3/003; H02J 3/28; H02J 2300/22; H02J 2300/28; G06Q 10/06315; G06Q 50/06; H04W 4/44; G05D 1/0088; E04H 12/003
See application file for complete search history.

(56) References Cited

U.S. PATENT DOCUMENTS

| 4,151,380 A * | 4/1979 | Blomeyer ................. E04H 1/14 379/143 |
| 4,254,308 A * | 3/1981 | Blomeyer ................. E04H 1/14 379/143 |
| 5,806,948 A * | 9/1998 | Rowan, Sr. ........... H04M 19/00 312/293.3 |

(Continued)

FOREIGN PATENT DOCUMENTS

WO WO-2014124251 A2 * 8/2014 ........ H04W 72/0446

*Primary Examiner* — Raymond S Dean
(74) *Attorney, Agent, or Firm* — Olive Law Group PLLC; Daniel I. Becker

(57) ABSTRACT

An apparatus comprising a pole having an interior; the interior comprising plural regions for electronics components, a first aperture proximate one of the regions, the regions comprising a core region, a utility region, a core region, and a sub-core region, and an individuated region access feature having a first position and a second position, wherein the electronics of a region are alternately accessible at the first position of the feature and inaccessible at the second position of the feature. Exemplary contemplated embodiments comprise alternative and alternately combinable access features such as a sliding plate, conduits which have a first position in one region of the pole and a second position in a different region of the pole, and a battery tray that maintains access to a workman as it is loaded with batteries.

18 Claims, 13 Drawing Sheets

(56) References Cited

U.S. PATENT DOCUMENTS

| | | | | |
|---|---|---|---|---|
| 9,698,477 | B1* | 7/2017 | Jabara | E04H 12/003 |
| 2008/0171559 | A1* | 7/2008 | Frank | G06Q 30/02 |
| | | | | 455/456.5 |
| 2009/0176512 | A1* | 7/2009 | Morrison | G08G 1/0141 |
| | | | | 455/456.6 |
| 2010/0315309 | A1* | 12/2010 | Hager | E04H 12/003 |
| | | | | 343/872 |
| 2014/0259978 | A1* | 9/2014 | Walton | H01Q 1/12 |
| | | | | 52/79.8 |
| 2017/0175711 | A1* | 6/2017 | Burkle | H02K 21/24 |
| 2019/0053296 | A1* | 2/2019 | Balappanavar | H04W 40/20 |
| 2019/0274105 | A1* | 9/2019 | Papa | H04W 52/0206 |
| 2019/0373582 | A1* | 12/2019 | Gupta | H04L 5/0016 |

* cited by examiner

POLE NETWORK

CROSS-REFERENCE TO RELATED APPLICATION

This application claims the benefit of U.S. Provisional Patent Application No. 62/744,639, "Pole Network," filed Oct. 11, 2018, which is incorporated by reference herein in its entirety.

FIELD OF THE INVENTION

The present invention relates to the fields of: utility poles, streetlights, wireless communication towers, directional networks and broadcast networks, wifi, wind-power electricity generation, solar power electricity generation, battery backup, security cameras and sensors, composite poles, decorative fascia for poles, and access hatches.

BACKGROUND OF THE INVENTION

The present state of wireless network communication grids are able to provide very wide coverage of the existing 4 G network with a significant quantity of cell towers. These towers can be very high, and can achieve sending data to many places by never exceeding a 6 GHz frequency. 5 G is the technology that will replace 4 G, and, when implemented, should be able to support operating at 24-86 GHz. This means that data rates can increase anywhere between four and more than 10 times the existing frequency, and with a few other supplemental technologies, very rapidly multiply to even more than that. With higher frequencies, the same amount of data usage per device means that the same coverage can allow for all of the unused multiplicative value to go towards adding users to the network.

To whatever degree the network does not increase by that unused multiplicative factor, data usage can be multiplied for each user. In short, access to data will be greatly increased in one way or another.

There is a large problem, though. There will need to be many more access points. Electromagnetic waves of a given power have a directly inverse relationship between wavelength and frequency. For any given multiple of increasing frequency, the wavelength decreases. Decreasing wavelength means that straight-line transmission of a signal must go through more cycles per unit distance between antennas. Further, broadcast distance is limited by power density. Power density of a signal is inversely related to the square of the distance from the broadcast point. Increasing frequency by a factor of four (from 6 Hz to 24 GHz), means that coverage decreases by a factor of 16.

To get the same coverage, at $\frac{1}{16}$th of the present coverage per access point, will require 16 times the access points. It may even need to be higher than that, because these higher frequencies degrade when they encounter physical obstructions to line-of-sight. Historically, such problems can be addressed with erecting very tall broadcast towers, but with so many access points, this becomes very undesirable.

Cell towers are currently extremely tall, metal poles, with many antennas and wires and fixtures extending in every direction. They are generally considered eyesores, but the current amount of them is not so great that they ruin the landscape. In small- to medium-sized metropolitan areas, particularly ones with preserved, historic buildings and gardens and parks, these towers can seem to be even less obtrusive, because the broadcast distance allows them to be in typically only a few, nearly outlying areas.

However, usage is getting so high, that we will approach the carrying capacity limit of 4 G in the near future. To accommodate 5 G, we cannot maintain the remote nature of the presently comparatively minute number of towers. The fleet of antennas necessary to blanket these areas will have to be mounted to something, and the current aesthetic of existing antennas is so atrocious that it is hard to imagine how historic and otherwise aesthetically-pleasing environments will be able to be undisturbed.

There is a need, therefore, to accommodate a high density of access points in a way that minimizes the visual offensiveness of a cell phone or antenna tower, so that the faster networks can be applied, while preserving the attractiveness of a city street.

SUMMARY

Several exemplary embodiments of the present invention pertain to a system comprising poles and pole mounted-devices, each of the poles comprising a material that is permeable to radio frequency transmissions. The poles are configured to house internally wireless communications and other devices that are necessary in order to accommodate the expansion of a wireless communications network. Locating these components (which are so ugly when haphazardly hung to the top of a very high cell tower) inside a pole reduces the unattractiveness of the system to only the unsightliness of a naked pole, for a pole with every component completely obscured from view. The system of poles and antennas is dense enough, though, that the antennas comprise directional antennas in very high quantity, in such a way that the antennas create a network configured to relay information between poles directionally. The directional functionality and close proximity between the poles allows for smaller antennas to achieve the distribution requirements, facilitating the use of smaller poles, and at lower heights.

Poles can be short enough and narrow enough in many embodiments that the poles can directly replace existing street lights, making addition of the entire network of 5 G coverage no more obtrusive to a city's existing aesthetics than the present-day omnipresence of ordinary street light posts. One exemplary embodiment comprises 15 foot tall, 10-inch exterior diameter, composite poles, each pole comprising at least one directional antenna and a coverage-providing omnidirectional antenna, for poles which are at the outermost edges of a distribution grid of such poles. Poles upstream of these poles, and successively deeper within the system, comprise at least two directional antennas.

The composite poles are also significantly lighter than comparably sized metal poles, making delivery and installation of the poles easier and cheaper than using metal poles. The poles also comprise decorative sheathing, so that the poles can provide similar or greater attractiveness than existing poles. In several exemplary embodiments, poles comprise additives to pre-color the poles, and eliminate the cost and time of painting the poles to a desired color.

While the poles are arranged to receive and facilitate the networking componentry and other devices within the pole, in several exemplary embodiments, the poles are configured to still receive components on the outside of the pole, in the manner of any other utility pole or lamppost or streetlight. In several of such exemplary embodiments, the poles comprise features to make installation of both the interior and any exterior devices easier than existing poles.

With existing poles, installation of lights or signs or cameras require passing wires through a small hole in the pole, high up on the pole, often using a bucket truck. Then the wires must be lowered to the bottom, and then connected to the local power grid through a very small access hole. Several exemplary embodiments of the invention comprise a sizeable access hatch aperture. One exemplary embodiment of the pole comprises a 3-foot tall hatch, the bottom edge of the hatch aperture being 3 feet above the surface of the ground. Opening the hatch aperture reveals a conveniently flat mounting backing plate across the interior, offset a few inches toward the hatch, away from the opposite side of the interior of the pole. Any wires lowered in the conventional manner can thereby be much more easily received and worked-with than on a metal pole.

Devices and components can be mounted to the backing plate without having to penetrate the exterior of the pole, protecting these components from direct exposure to moisture. Such large apertures are not feasible in a similarly sized steel pole, because the weight of the pole, above the hatch, is so great that the removed material would cause a significant detriment to strength that would make the pole unsafe. The decreased weight offers a compounding strength advantage over a metal pole, with respect to any hatches located at even higher heights.

Several exemplary embodiments of the present invention comprise lateral arms to support cameras and light fixtures, and a hatch aperture on the pole below the arms that allows for the arms and the fixtures to be attached to the pole with fasteners inside the pole that are accessible by reaching up to the interior of the pole through the hatch aperture. Metal poles, without the ability to accommodate a hatch aperture, typically require holes which penetrate the full diameter of the pole to accommodate laterally-extending arms and fixtures that is less attractive and also makes supporting the components difficult while tightening the fasteners, in order to securely locate the fixtures. Being able to reach inside the pole greatly decreases the awkwardness and minimizes risk of dropping the fixture while attaching it to the pole.

Also, from this position, routing wires through an access hatch, rather than a small hole, to be accessed from another hatch aperture (such as one several feet below, one accessible at ground level), is even easier than in the case of a pole merely having a lower hatch aperture.

While an aperture can compromise the strength of a pole of any construction, the composite pole is so much lighter than the steel pole of the same size, that any compromise to the integrity of the pole caused by the aperture is eliminated by lining the pole along that region with a metal lining or sleeve inside, the interior diameter of the pole.

In several exemplary embodiments, the pole is configured to both burial and flange-mount installations. In the case of one exemplary flange-mount embodiment of the pole, the sleeve/lining extends to the bottom of the pole, and is connected to the flange itself.

Composite poles of several embodiments of the present invention have comparable or better wind load performance than existing metal poles, but are also able to be constructed in formulations or with additives that impose no chemical burden on the installation site, whereas wooden poles might leach pressure-treatment chemicals, or a metal pole might rust or otherwise react with the soil. The composite pole also has greater dielectric strength than a metal pole, offering a reduction in the risk of electrocution to a lineman or engineer, especially during repairs or replacements to a pole with a live line.

Like any other utility pole, the poles of the present invention are able to receive electricity from the local power grid. However, the present pole is also configured to operate off -grid, in embodiments that comprise battery backup and embodiments with either of solar panels or wind generators or both. In several embodiments, the battery backup system is housed within the pole, below the hatch aperture, and protected from exposure to floodwater, groundwater, and internal accumulation by comprising a base platform and tray that separates an enclosed housing from the ground and encloses a battery pack of desired specification with an enclosure atop the tray. When weather allows, a sufficient amount of wind or sun on a pole makes the particular pole energy-positive, and feeds energy back into the grid. Contemplated embodiments of the system comprise ones having several battery packs also comprise grid-balancing power capability.

Several embodiments comprising poles or groups of poles having battery backup in sufficient quantity are configured to support electronic device and even electric vehicle charging. Such embodiments, if augmented with the appropriate interface and in connection with an electronic payment system allow for the charging station to function as a commercial metered point of sale for access to the charging facilities.

Wind-power embodiments and embodiments having other weather sensors are able to provide a heretofore new benefit. The spatial density of the network of poles provides a distributed set of sampling locations, and the windpower output is detectable as data of the state of the wind in very high resolution, per unit ground area, making possible a tornado/imminent weather change detection system.

The pole is also better configured to shielding the networking devices from weather than the cumulative existing enclosures for housing such devices adjacent one another about the exterior of the pole, because the significant height of the pole allows for natural exchange of cooler and warmer air between the top to the bottom of the pole. Exemplary embodiments comprise poles with such ability to facilitate adequate cooling for several 5 G-speed network-supporting-devices is such that very minimal venting near the top of the pole is enough to allow the heat produced to escape into air outside the pole, even without a return vent at a lower height on the pole.

This is especially true for arrangements of the networking devices in which the functional componentry of the devices is installed without the individuated enclosures that would be necessary to install each of the devices separately, on the outside of a pole. Embodiments of the invention also comprise ones with vanes and fans and conduits to enhance the airflow and heat exchange, to cool components.

Contemplated exemplary embodiments further comprise features which enhance access to use of the interior of the pole, including ones providing a rail system extending along the length of the pole, ones having a multiple rail system, ones having a continuous rail or cooperative rail system, such as embodiments which provide a rail along the length of the lining as well as a rail which extends vertically from the top of the lining, and ones in which carriages or mounting plates are installed with respect to said rails. In one such embodiment, a mounting plate is vertically translatable within the pole, the lower edge being alternately locatable throughout a distance along the length of the pole, between the bottom of the pole and the top of the lining.

Within a pole embodiment having a hatch with its upper edge at 6 feet above the ground, the exemplary plate comprises a pair of rolling supports proximate to the top of the plate, located in a rail on the interior of the pole, extending upward, from the top of the lining. The plate further comprises rolling supports proximate the bottom of the plate, those being located in a rail located on the interior of the lining, extending up from the ground, to the top of the lining. Thereby, the plate provides a 6 foot mounting surface that is fully accessible directly through the hatch, without having to reach above or below the hatch. Sliding that plate upward, to the end of its motion, thereby elevates those components up to 12 feet from the ground, without a ladder.

Contemplated embodiments of the pole which comprise such a rail and plate feature include ones which also comprise a static backing plate, and vice-versa. Embodiments comprising both a fixed and moving/mounting/backing plate comprise ones in which the devices within the pole are sized to such a scale that there is adequate clearance for the moving plate to descend its entire length without impacting the devices installed on the fixed plate.

The presently disclosed subject matter pole network, by several contemplated and non-limiting embodiments and aspects:

According to an aspect, an apparatus, comprising a pole having an interior; the interior comprising plural regions for electronics components; a first aperture proximate one of the regions; the regions comprising a core region, a utility region, a core region, and a sub-core region; and an individuated region access feature having a first position and a second position, wherein the electronics of a region are alternately accessible at the first position of the feature and inaccessible at the second position of the feature.

According to an aspect, similar to the above, and further comprising an additional pole and the antenna regions of the poles comprising directional antennas being configured to wireless communication between the first and second poles.

According to an aspect, similar to the above, and further comprising an additional pole that is a third pole; and the second pole further comprising a second directional antenna configured to wireless communication between the second and third poles, such that the second pole is an inner pole and the first, second, and third poles form a wireless network.

According to an aspect, similar to the above, and further comprising an additional pole that is a fourth pole that comprises a first directional antenna in directional communication with the first pole and a second directional antenna is in directional communication with the third pole, such that the fourth pole is an inner pole, and such that the network is configured to alternate paths of directional wireless communications between the first pole and the fourth pole.

According to an aspect, similar to the above, and wherein the poles each comprise an omnidirectional antenna for communicating data to wireless devices proximate to the particular pole, such that a wireless device in connection to a particular omnidirectional antenna can access data available at another pole.

According to an aspect, similar to the above, and wherein the poles are configured to facilitating autonomous driving networks, vehicle tracking, and mobile device tracking.

According to an aspect, wherein the first pole comprises an omnidirectional antenna for communicating data to external electronic communications networks, such that a device in communication with either of the poles can communicate to the external communications networks.

According to an aspect, similar to the above, and wherein the first pole comprises access to a ground connection for communicating data to external electronics communications networks, such that a device in communication with either of the poles can communicate to the ground communications networks.

According to an aspect, similar to the above, and wherein the aperture is proximate the antenna region and the access feature comprises a conduit extending between the first position at the bottom of the pole and the second position in the antenna region, such that electrical connection can be run inside the conduit from the first position to the second position and accessed by a workman at the aperture accessing the antenna region to connect the electrical connection to the antenna.

According to an aspect, similar to the above, and further comprising a responder network configured to locate a site requiring response by comparative signal strength and change in signal strength relative to the particular poles.

According to an aspect, similar to the above, and further comprising at least one of call stations, parking meters, and energy/charging access points located with respect to one of installation to the pole or in directional communication with an antenna of one of the poles, such that the apparatus provides a secure directional-wireless-reporting-network.

According to an aspect, similar to the above, and the poles further being in energy transmissive connection to grid power and configured to monitor and meter energy usage for the particular pole and communicate the data of energy usage to the other pole, and further comprising a battery configured to store energy to alternately store power at the particular pole and deliver power to the grid, to at least one of balance energy usage of the grid, with respect to alternately storing adequate energy for the demands of the particular pole, and assisting the grid as necessary to meet fluctuations in demand for energy in locations on the grid that are proximate to a particular pole.

According to an aspect, similar to the above, and wherein at least one of the poles comprises energy generation electronics components to supplement energy storage and balancing at the particular pole, one selected from a list comprising solar cells and wind generators, and is configured to consider solar and wind energy production to monitor and respond to demand for energy.

According to an aspect, similar to the above, and wherein the aperture is proximate the core region and the access feature comprises a battery support tray in the sub-core region configured to maintain direct access to a workman at the aperture to the batteries, as they are installed to the sub-core region by the tray being configured to receive layers of batteries having a layer height and layer weight, and descend a distance equal to the layer height as batteries are installed to an amount that reaches the layer weight.

According to an aspect, similar to the above, and wherein the tray is supported proximate the edges of the tray with springs distributed about the periphery of the interior of the sub-core region of the pole.

According to an aspect, similar to the above, and wherein the aperture is proximate the utilities region and the access feature comprises a conduit extending between the first position at the bottom of the pole and the second position in the utilities region, such that an electrical connection can be run inside the conduit from the first position to the second position and accessed by a workman at the aperture accessing the utilities region to connect the electrical connection to the components of the utilities region, comprising electronics components for a list comprising: external lighting, cameras, audio detectors, digital signage, weather sensors, solar and wind generators, and external and internal antennas.

According to an aspect, similar to the above, and wherein the aperture is proximate the core region and the access feature comprises a plate that is alternately positionable to a first position in the utilities region and a second position in the core region of the pole, such that the electronics components of the utilities region can be accessed by a workman at the aperture to install or service the components of the utilities region when the plate is at the second position.

According to an aspect, similar to the above, and wherein the pole comprises electronics components in the core region that are alternately accessible when the plate is at the first position and inaccessible when the plate is at the second position, to the workman at the aperture, to install or service the components of the core region.

DETAILED DESCRIPTION

Figure 1A:
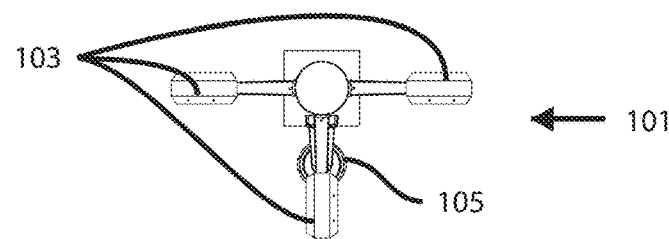
FIG. 1A shows a plan view of an exemplary security pole embodiment of the present invention.
Figure 1B:
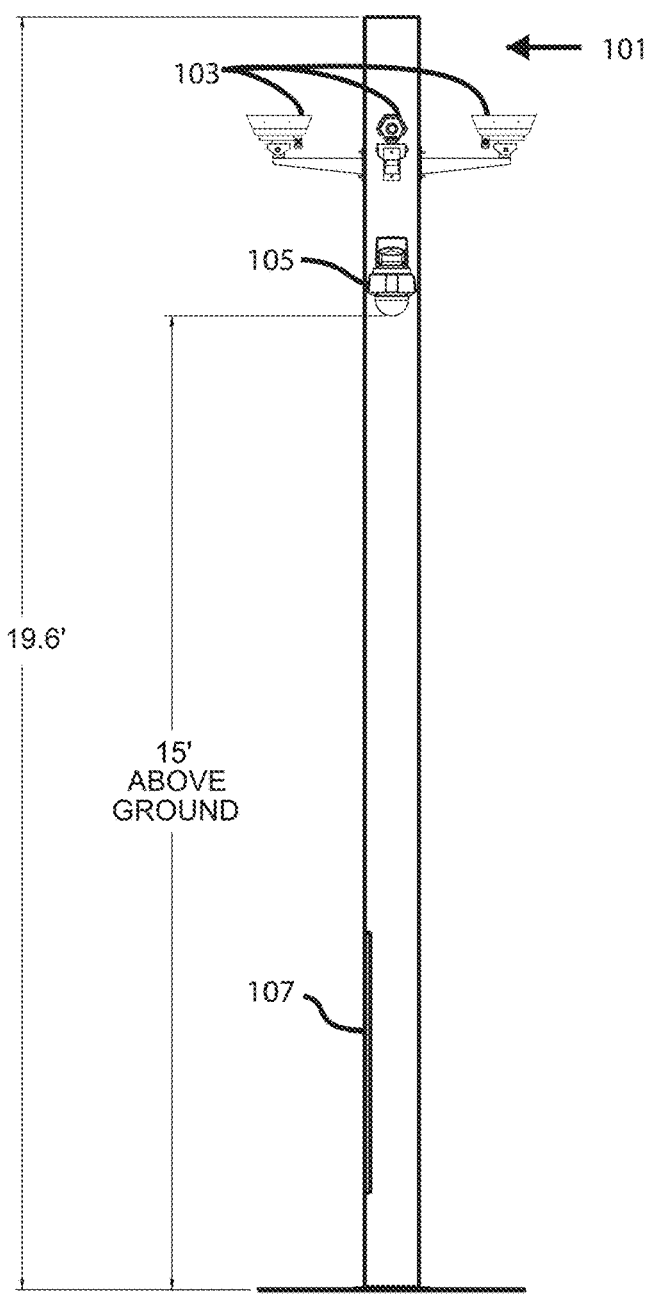
FIG. 1B shows an elevation view of an exemplary security pole embodiment of the present invention.
Figure 1C:
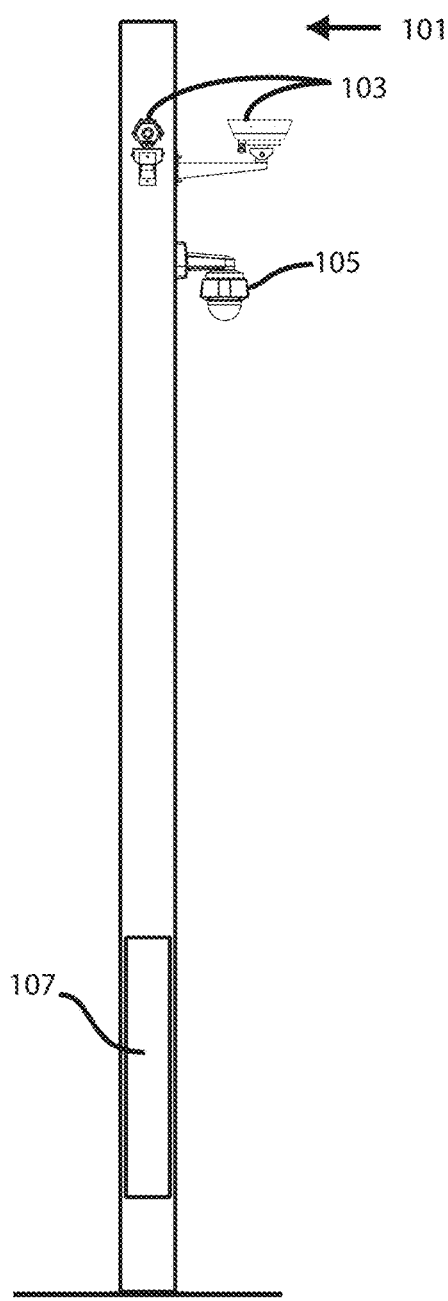
FIG. 1C shows an elevation view of an exemplary security pole embodiment of the present invention.

FIGS. 1A-C show views of an exemplary security pole 101 embodiment of the present invention. This pole 101 comprises thermal 103 and PTZ 105 cameras, it excellent at operating in low light and providing covert direction of focus, to a passerby that might otherwise attempt to skirt a camera's field of view. Here, the cameras 103, 105 are located at an upper region of the pole (15' feet above the ground, for example), primarily intended for utilities, a ~utilities region, where reach to a higher point is largely inaccessible via an access panel 107, but the pole 101 embodiment shown here contemplates an excess of height (19.6', for example) beyond what is necessary to accommodate such cameras and other similar components.

Figure 2:
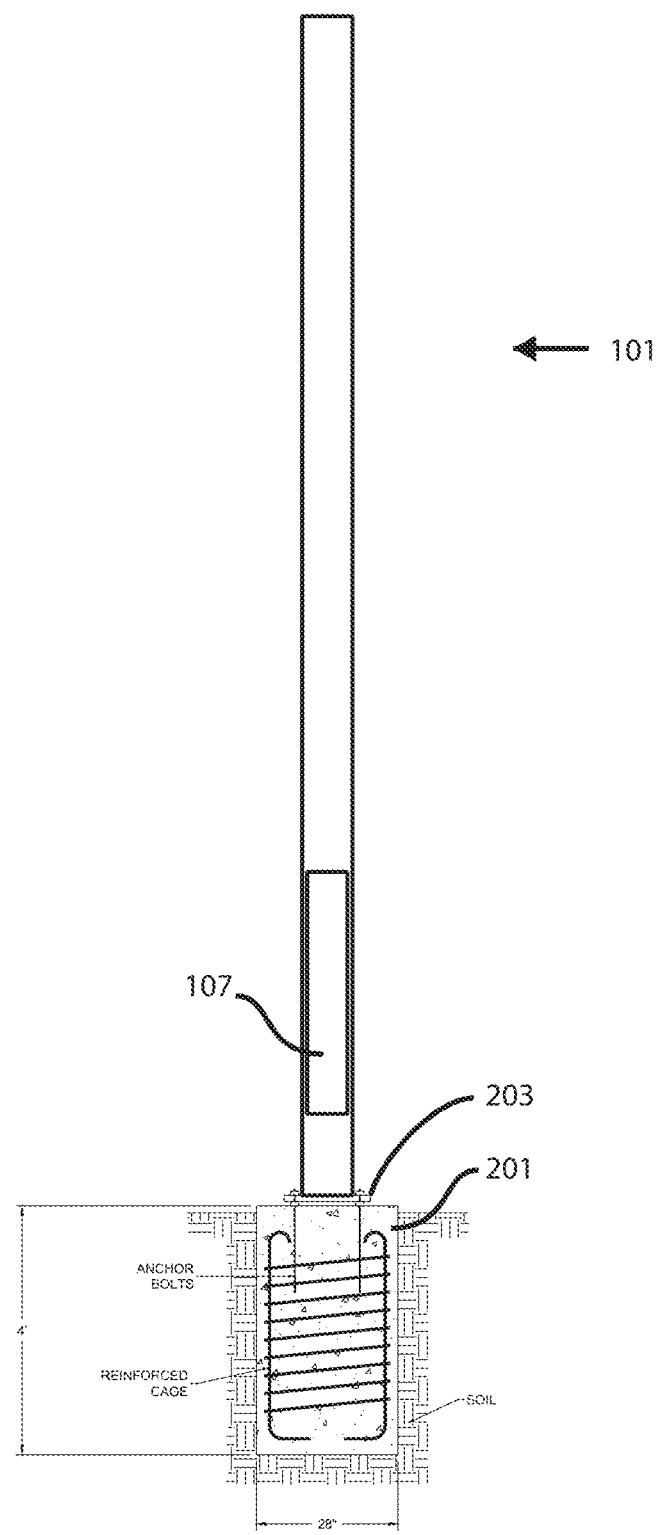
FIG. 2 shows a close section view of an exemplary footing of a security pole embodiment of the present invention.

FIG. 2 shows an exemplary footing of the security pole 101 shown in FIGS. 1A -C. It comprises a poured concrete footing 201 with a flanged base plate 203 bolted into the concrete footing 201.

Figure 3:
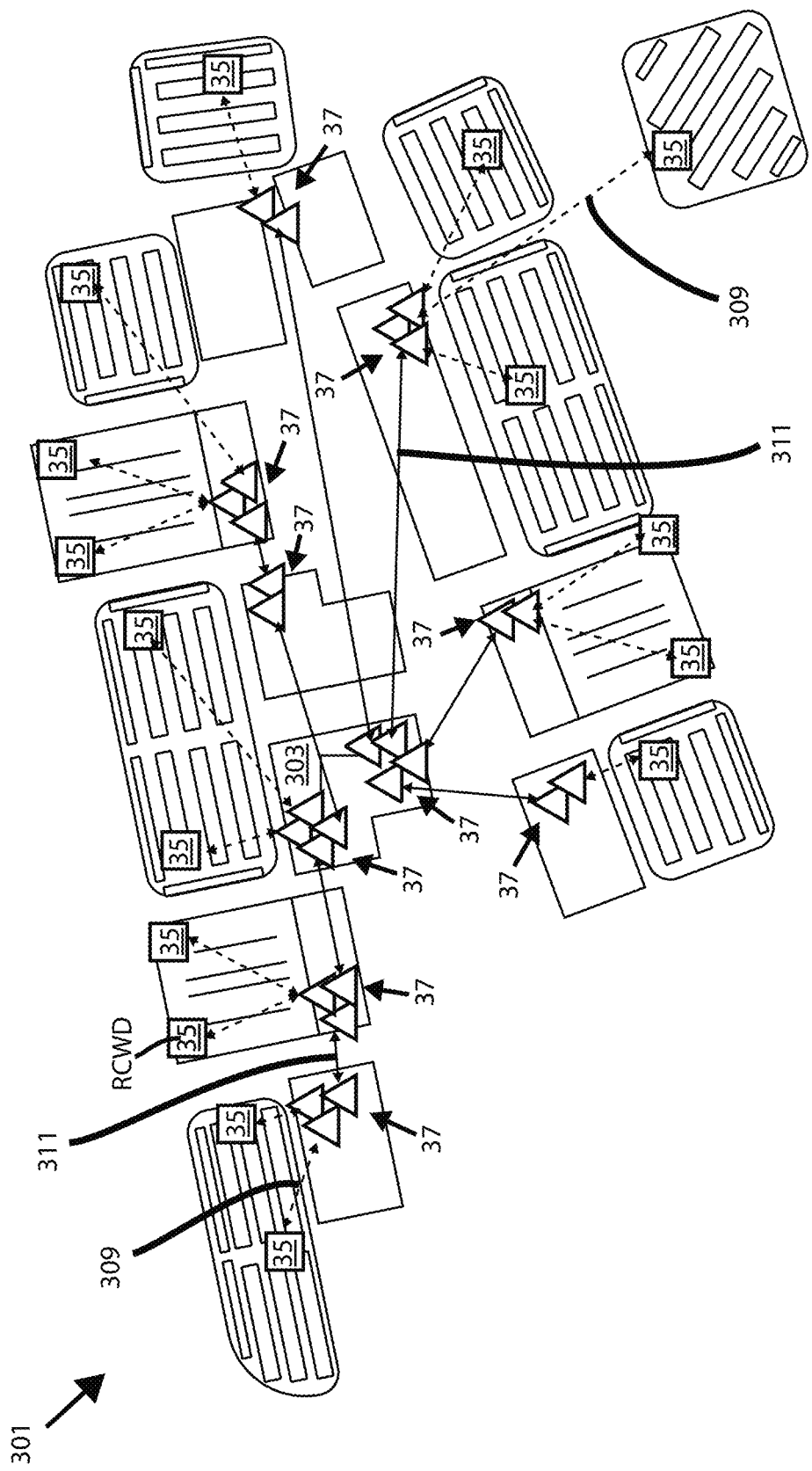
FIG. 3 shows an exemplary wireless directional backhaul network implementation embodiment of the present invention.

FIG. 3 shows an exemplary wireless directional backhaul network 301 implementation embodiment of the present invention. Particularly, this is network for communicating data from points of user access that are located in parking lots in a corporate office facility with a central monitoring and response center at a central building 303. The central building 303 comprises a monitoring/central server for uploaded information from the remotely -connected wireless devices (RCWD) 35, shown as squares. Each RCWD 35 wirelessly reports data to a node 37 (groups of at least one antenna/point of communication triangle) of this network, by a coverage-type antenna of the node, a coverage-type data connection 309 (dotted arrow lines). That node 37 then communicates via directional wireless signal, using a narrow -angle backhaul-type or directional antenna to another node 37 that comprises a subsequent directional wireless connection 311 (solid arrow lines) to another node 37, until the data reaches the central building 303.

Figure 4:
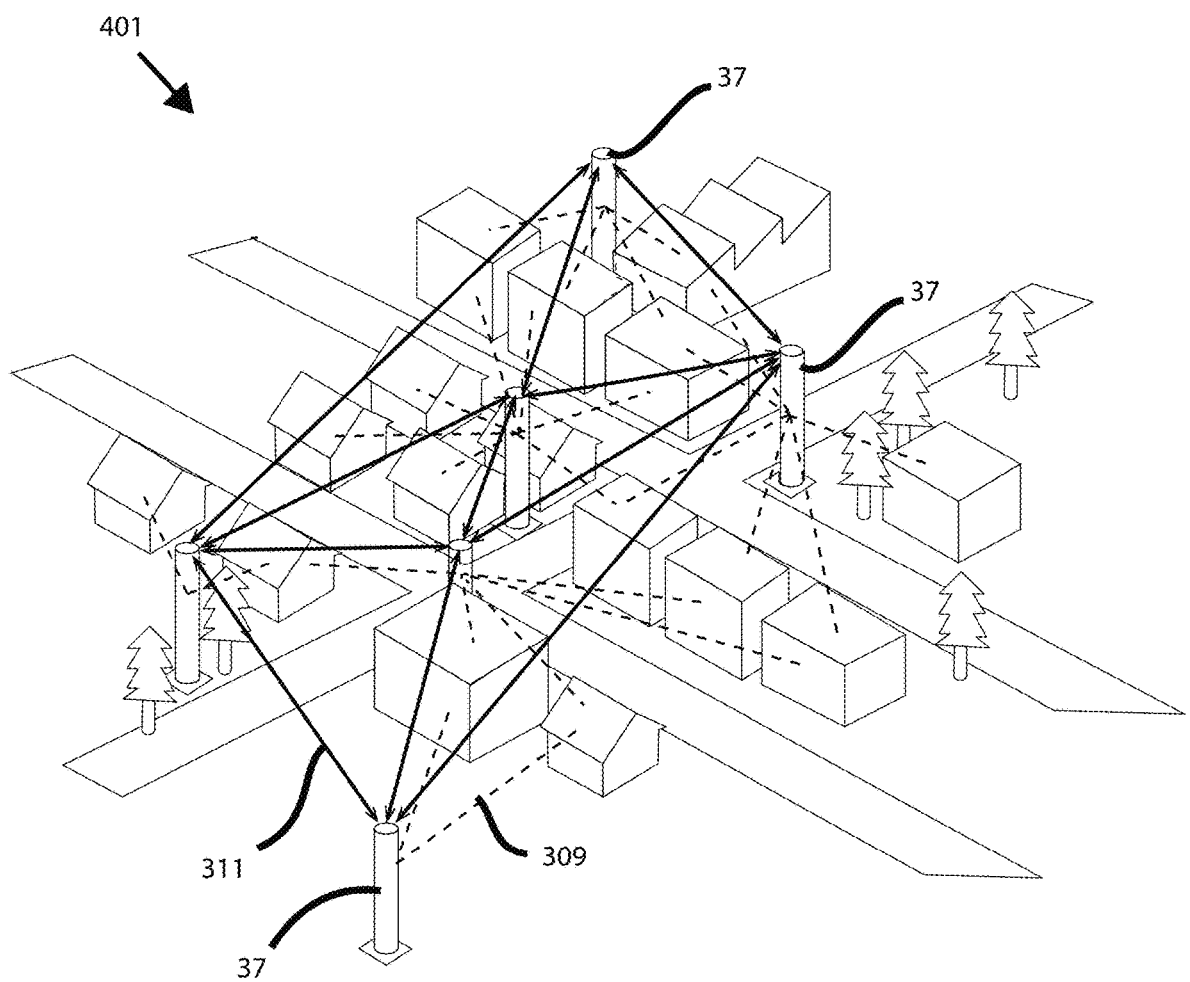
FIG. 4 shows an exemplary mesh network implementation embodiment of the present invention.

Exemplary poles illustrated in other figures of this application are configured to support the functions required here, as any one of the nodes 37, and are also configured to support the functions as one of the remote devices 35, if such a pole is equipped with an interface (929, see FIG. 9) to facilitate a user to access the network 301 with devices of such a pole, itself FIG. 4 shows an exemplary network 401 implementation embodiment of the present invention. Like the network embodiment 301 shown in FIG. 3, network 401 of FIG. 4 contemplates nodes/poles 37 which communicate by directional and coverage antennas, in order to provide many points of access.

Unlike FIG. 3, however, there are redundant and alternative paths of directional signals 311 between alternative nodes, to compensate for ones which are not in direct communication, as well as multiple nodes providing coverage signals 309 as alternative points of access, for several locations within the coverage area, and in higher density for poles 37 that are closer to the geographic center of the coverage area. This is very valuable to the present invention, because aesthetically pleasing poles, with unobtrusive height and with relatively few components (compared to a massive cell tower), may have capacity/burden limitations, intermittently varying performance at nodes of intermediate connection points, and varying degrees of best-line-of-sight to alternative nodes.

With this network 401, if a tree or a tall truck obscures from a pole 37 the pole 37 which would otherwise lie along the best path across the network, the pole 37 can instead communicate in the next-best direction, using another directional communication 311, in order to circumvent the obstruction. Also, when several alternative paths are available, the network 401 is able to apply bandwidth to the poles 37 at which the network usage is highest.

Figure 5:
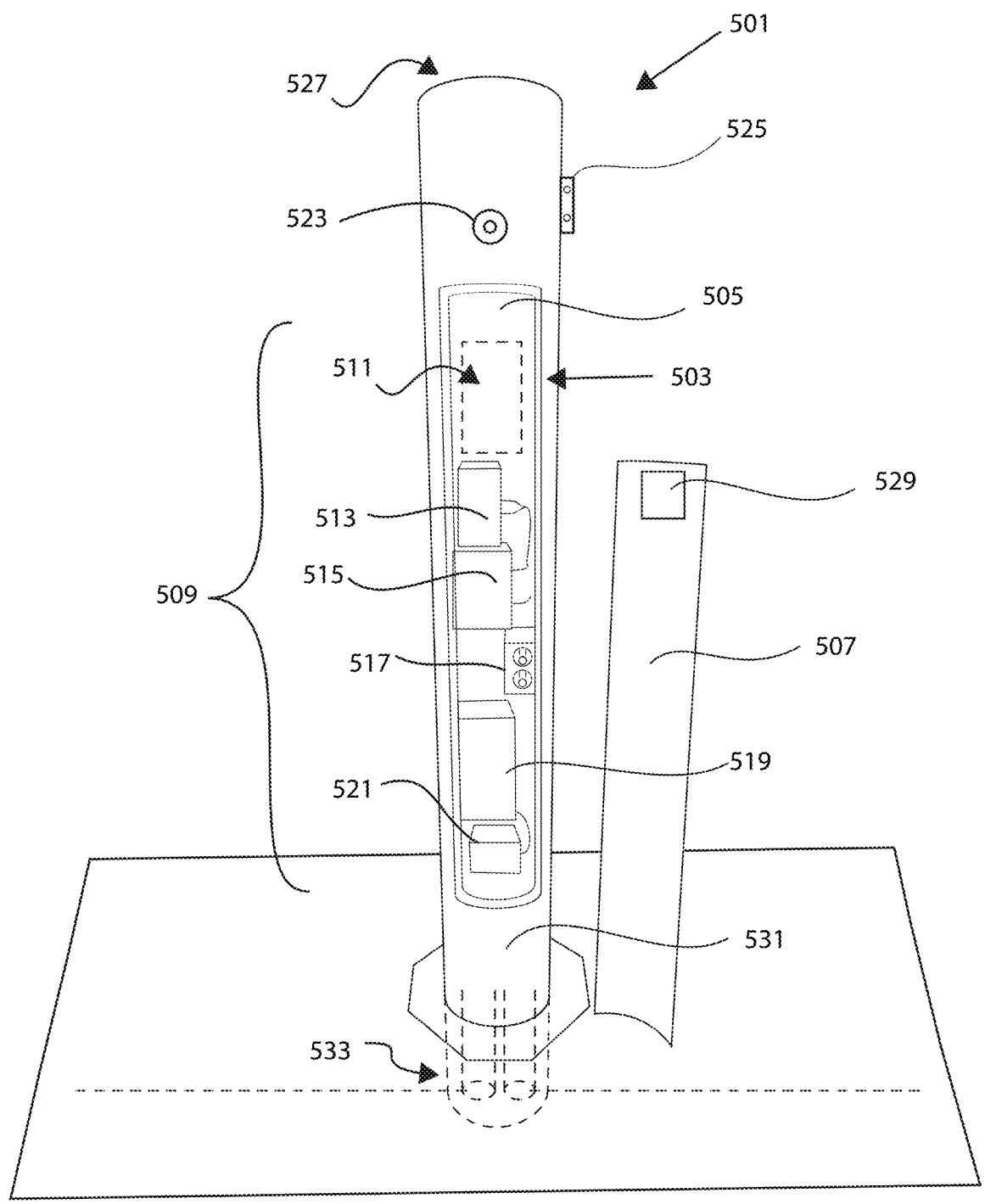
FIG. 5 shows an exemplary embodiment of an exemplary pole with a cover removed from an aperture and showing specific components of a core component set, as installed to a fixed plate.

Referring now to FIG. 5, what is shown is an exemplary pole (501), hatch -aperture (503), and backing plate (505) embodiment of the present invention. The pole (501) is shown with a cover removed (507) from an aperture (503) and showing specific components of a core component set (509), as installed to a fixed electronics components backing plate (505).

Particularly, of the core component set 509, the following components are in plain view: a Highspeed Secure Layer 3 Managed POE+Fiber Switch 513, a Fiber Optic and Cable Tray Patch Panel 515, a 110VAC GFI Power Outlet or Other types of AC/DC Power Options 517, a Breaker Box and Fuse Panel 519, Low and High Voltage Surge Suppressor w/EMI Filtering 521 and a Space For Custom Micro Server for AI Cyber Security & Local Analytics Processing 511.

Above the core components set 509, there are several features which might otherwise be considered to be components of a region that is above the region through which the core component set 509 is accessible via the aperture 503, but for the height of the aperture and the relatively low height of these components within the pole 501. Particularly a pinhole camera 523 for covert applications and security monitoring and recording operations, and conduits (not shown, see FIGS. 12A-B) for connecting to exterior equipment (not shown) that can be supported on an exterior equipment attachment bracket 525, (such as a camera, LCD monitor, solar panels, or antenna (particularly a coverage-type antenna).

Similarly to other embodiments which may be significantly taller (see various other FIGS.), this pole 501 also comprises a removable top cap 527 or custom adapter bracket for components that may be preferable to mount near the top of the pole 501 (such as an antenna, particularly a directional antenna, in the case of installation at a site with local line-of-sight -obstructions at lower heights), or provide access to components which require an additional or alternative access feature to access the above components which may be above the common core components set 509, and/or would not otherwise be accessible by a workman accessing the interior of the pole via the aperture 503.

The entire set of componentry shown installed in the pole 501 is configured to be itemized and indexed for inventory management, particularly in the case of installation of many such poles in a local network (see FIGS. 3, 4), such that a workman performing a series of operations or procedures on several poles may be able to access the specifications of each pole. Such information can be accessible via a custom QR Code 529, shown here on the inside of the cover 507.

Below the aperture 503, in the region ending proximate to the bottom of the aperture 503, there is a volume 531 for storage of batteries for backup of the individual componentry and networked/other functions supported by the pole 501 and its components.

Below the ground level, where this pole 501 in this case is one that is buried in a subterranean footing and comprises underground conduit interfaces 533 for ground-grids, primarily for ingress and egress of power and data networks which may already be installed at the site of the pole 501.

Figure 6:
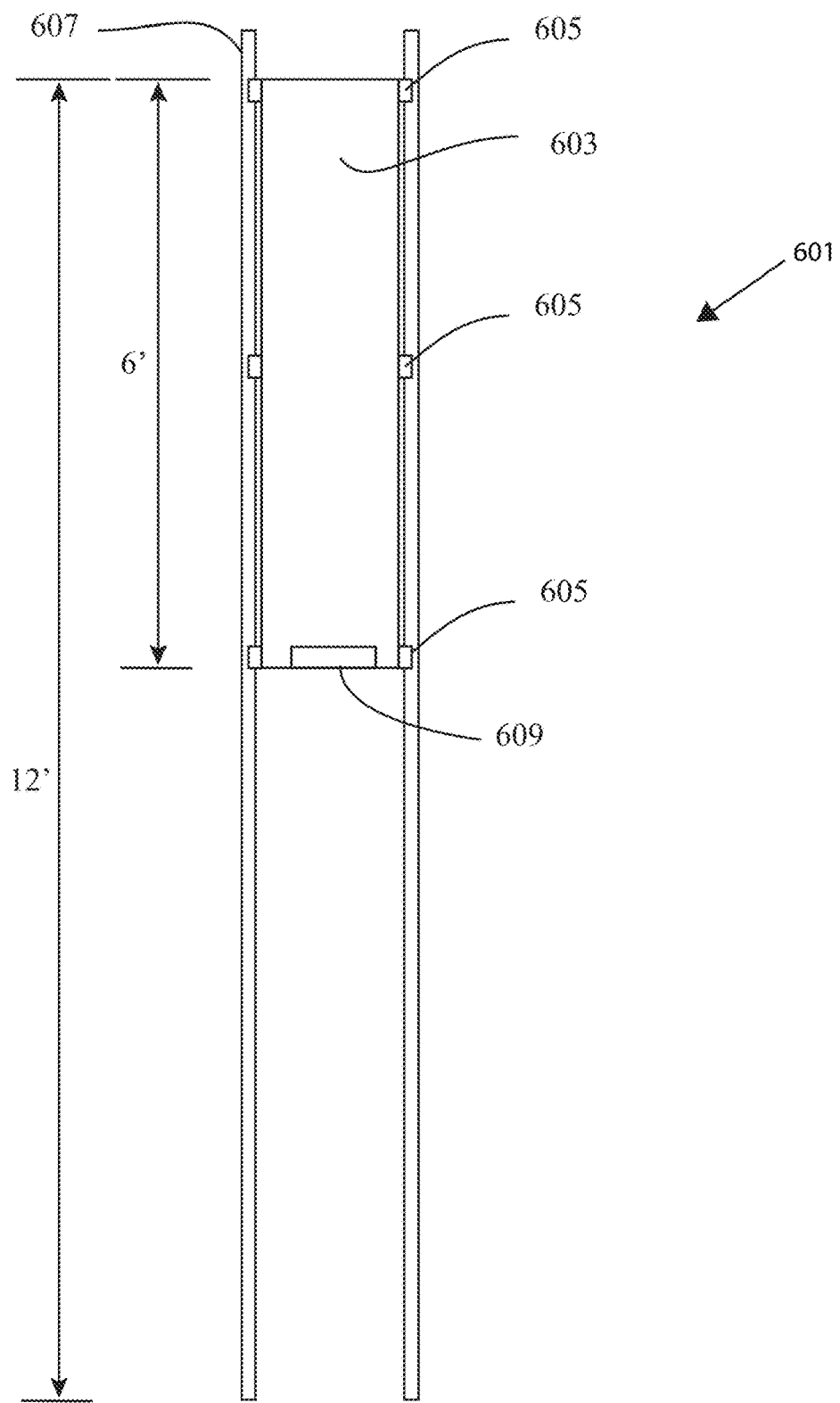
FIG. 6 shows an exemplary sliding backing plate embodiment of the present invention.

Referring now to FIG. 6, what is shown is an exemplary sliding backing plate embodiment of the present invention comprising a rail system 601. The rail system 601 is configured to extend along the length of a pole (not shown, see FIGS. 10, 11, 12A), and allow a mounting plate 603 to be vertically translatable within the pole. Within a pole embodiment having a hatch with its upper edge at 6 feet above the ground (similar to those shown in FIGS. 10A-12A), the exemplary plate 603 comprises a pair of rolling supports proximate the top of the plate (topmost pair of wheels 605), located in a rail 607 configured to the interior of such a pole.

The plate further comprises rolling supports (lowermost pair of wheels 605) proximate the bottom of the plate 603, those being located in the rail 607, the rail 607 being configured to extend from the bottom of the interior of a pole (see FIGS. 10A-12A), extending up from the ground. Thereby, when installed into a pole having an aperture with a top edge proximate 6 feet from the ground, the plate 603 provides a 6 foot mounting surface that is able to be moved to a height at which it is fully accessible directly through a hatch aperture (see FIGS. 10A-12A), without having to reach above or below such a hatch. Sliding that plate 603 upward, to the end of the its motion, thereby elevates those components up to 12 feet from the ground, without a ladder. To assist in being moved with the range of direct access of a workman, the plate 603 comprises a handle 609 proximate its bottom edge.

With respect to FIGS. 7A-B and 8A-B, two preferred methods of fixation of the poles are shown. They include an embedded Pole Installation Method and an anchor based pole installation method, respectively.

Figure 7A:
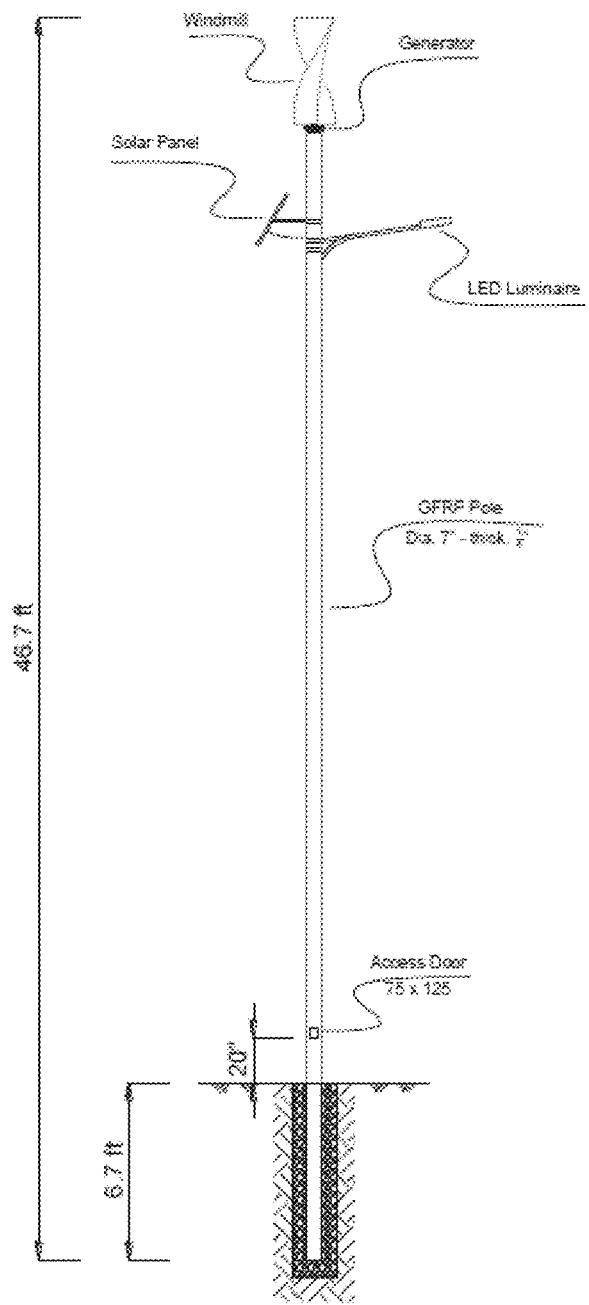
FIG. 7A shows an elevation view of an exemplary pole embodiment of the present invention installed with an Embedded Pole Installation Method.
Figure 7B:
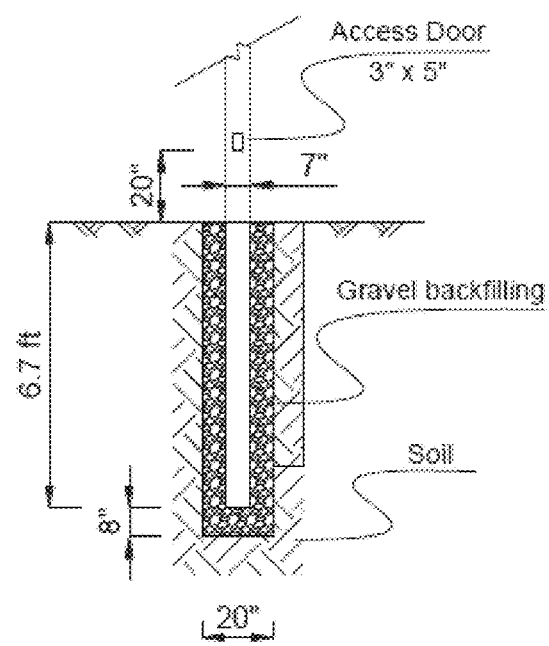
FIG. 7B shows a close section view of an exemplary embodiment of pole of the present invention installed with an Embedded Pole Installation Method.

Referring now to FIGS. 7A and 7B, what is shown is an embodiment of an Embedded Pole Installation Method.

Here, the pole is buried into the ground directly with no additional treatment except for a layer of backfill gravel (or concrete fill) around and down the pole to avoid any penetration may occur. The embedment depth of the pole into the ground is usually measured and determined as 10% of the pole's length plus 2 ft (FIG. 1). This method is very easy, most economical and requires the least amount of time for installation. The Glass Fiber Reinforced Polymer (GFRP) poles are very durable types of poles with no rust, rot, or leaching. Because of the remarkable properties of our GFRP poles, it is encouraged that our partners and clients use the Embedment Method of fixation as there are no side effects of installing the poles in the soil.

The Embedment Method works very well with most types of soils, but it is not recommended to be used in very loose soil applications and environments (e.g. sandy soil).

However, our GFRP poles can be used in sandy soil type applications and environments but will add additional cost to the installation and require embedding more of the pole into the soil, typically additional 1-1.5 ft per 10 ft pole length, reducing the overall pole height.

The backfilling material around the pole can be gravel, concrete fill, or cement -soil. The width of the backfilling is usually 6 inches (150 mm) to 8 inches (200 mm) while the layer below the pole is at least 8 inches (200 mm) (FIG. 2). An access door, having a nominal 3 inches (75 mm)×5 inches (125 mm) opening, is installed at 20 inches (500 mm) above the ground level to each light pole.

Figure 8A:
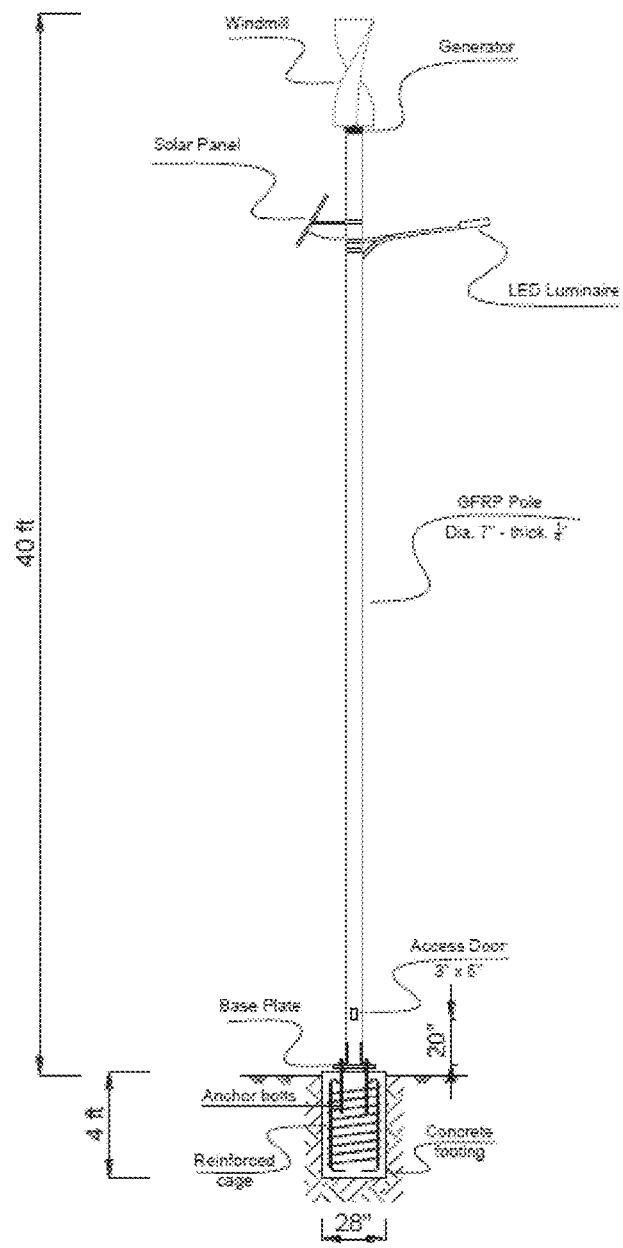
FIG. 8A shows an elevation view of an exemplary pole embodiment of the present invention installed with an anchor based pole installation method.
Figure 8B:
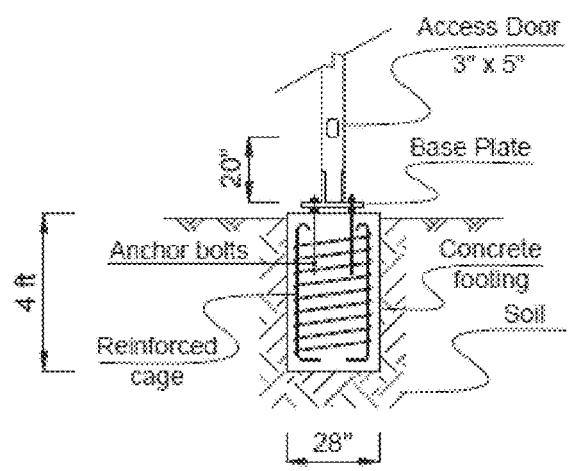
FIG. 8B shows a close section view of the footing of an exemplary pole embodiment of the present invention installed with an anchor based pole installation method.

Referring now to FIGS. 8A and 8B, what is shown is an embodiment of an Anchor Based Pole Installation Method:

Here, the pole is fixed to the ground using a base plate connected to the pole. The base plate is fixed to a concrete footing using anchor bolts (FIG. 2). The anchor bolts are connected to the reinforced cage of the concrete footing before casting the concrete material. The base plate is then placed above the footing and secured to the top surface. The pole is then attached to the base plate using adhesive material while the base plate is secured using the anchor bolts and nuts. This method is typically more expensive for installation but it is effective with all types of soils. This method also reduces the risks and damages when a vehicle or other object collides with the pole which makes this method attractive when the poles are installed on or near roadways and vehicle traffic areas.

The concrete footing of the light pole has a diameter of 28 inches (700 mm) and a height of 4 ft for the 40 ft (12 m) pole (FIG. 4). The reinforced cage consists of 6 rebars #5 and spiral reinforcement #3 with 5 inches (125 mm) spacing. An access door, having a nominal 3 inches (75 mm)×5 inches (125 mm) opening, is installed at 20 inches (500 mm) above the base plate to each light pole.

By combining current cutting edge technologies with custom, long lasting, cost -effective composite utility poles (Decorative Pole Exteriors, Utility Poles, Street Light Poles, etc.), utility companies can capitalize on their real estate-like positions to provide needed public services while enhancing income streams which help pay for the hardware, installation and maintenance of the grid distribution lines and the technology solutions encompassed within and/or on the new utility poles for public, private and commercial business applications.

Figure 9:
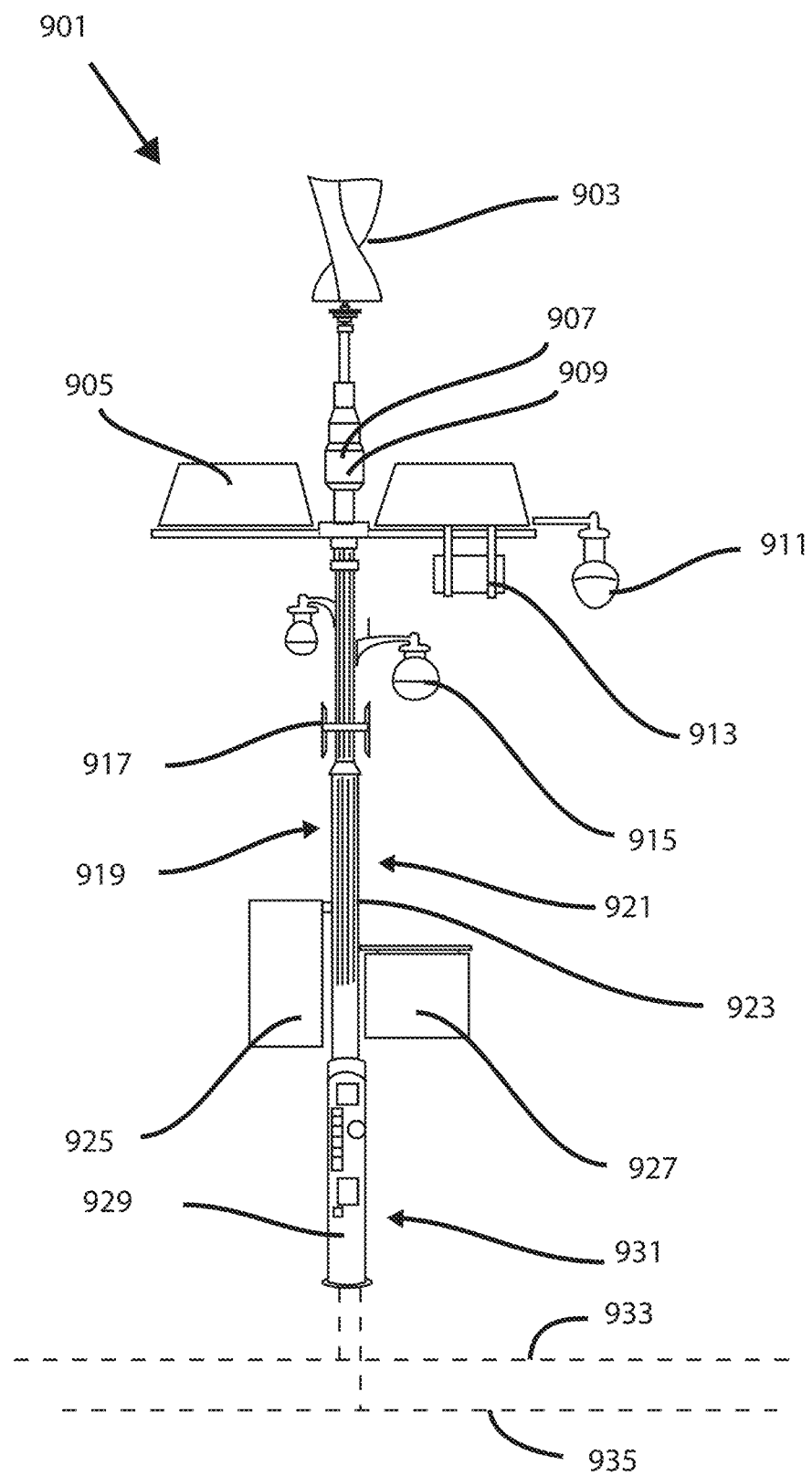
FIG. 9 shows an elevation view of an exemplary networked pole embodiment of the present invention.

Referring now to FIG. 9, what is shown is an exemplary networked pole embodiment of the present invention. This pole (901) is a networked pole by comprising a variety of telecommunication technologies. Below the ground surface, the pole (901) is connected to the local site's wired data communication grid (935).

Further, this pole (901) is a networked pole by also comprising a variety of antennas to communicate as part of a wireless network. There are Backhaul/Directional Antennas (907, 909). Specifically, these backhaul antennas (907, 909) are mounted at an antenna broadcast height region on the interior of the pole, including a higher band antenna (907) (4.9 GHz/5 GHz/Higher Bands), and a Macro Tower antenna (909) (Macro Tower Cell Backhaul antenna).), The pole (901) also includes two WiFi antennas (917, 919), specifically an Exterior Mount antenna (917) and an Interior Mount antenna (919). Exemplary wavelengths of operation are 2.4 GHz/5 GHz. The pole (901) also includes Exterior mount Cell/3 G/4 G/LTE and 5 G antennas (913).

Beyond the network pole aspects of this pole (901), The pole (901) is configured to generate renewable solar energy with solar panels (905) and renewable wind energy with a wind generator (903). The pole (901) also provides ordinary lighting and public-visibility benefits via an LED light fixture (911), mounted on a lateral arm, and physical signage (925) and digital signage (927) on the exterior of the pole.

The pole (901) is also configured to provide safety, security, and emergency responder benefits, by comprising an in-pole covert camera (921), a day/Night/Thermal Camera and audio device (915) mounted on the exterior of the pole (901), and an emergency call station (929) at the base of the pole, in direct access at the ground level. The combination of these effects a high speed $1^{st}$ responder network (which may use any of the Wifi antennas (917, 919), Cell antennas (913), wired grid data (935), or pole-to-pole communication backhaul antennas (907, 909) to relay a communication to responders), both in reliability of a communications path which uses the highest possible speeds, and in providing a multitude of early-warning systems for detecting problems as quickly as possible, and specificity of the origin of the communication or site at which response is otherwise necessary.

The pole (901) also comprises battery storage. Here, the storage is configured such that batteries are contained in the base of the pole (901), and are able to provide a variety of power features. Energy can be provided-to and accessed-from batteries in this battery storage (931) region of the pole. Inputs include grid power (933), the solar generator (905), and the wind generator (903). Outputs include the antennas, as well as any of the other electronic devices described above, as well as the grid power (933) itself.

In at least one contemplated embodiment, the present invention contains adequate battery storage such that it is able to function as a selectively accessible storage for electricity to the power grid. In the case of a network of poles each providing such battery capacity, the several poles, distributed to locations of fluctuating energy load, would provide a power balancing function for the grid, as demand transitions over the course of the day, but also in the event of unforeseen interruptions of power and sudden surges, at any particular location serviced by power in the vicinity of any such pole.

The pole (901) also provides regions for small network equipment that can be hidden within the pole, including weather and power and data usage equipment that augment or supplement any other components, including GPS and devices and components that facilitate Automated Vehicle Driving Technologies.

Finally, the pole (901) may additionally comprise such vehicle-adjacent functions as EV charging (from the battery storage (931) region or grid power(933)), and parking metering (not shown).

Considerable variables exist within this market segment opportunity and include: a variety of existing poles (which may be owned by different entities), Different rights-of-way (which may be owned by different entities); State and Federal regulations (which may restrict income flow to stake holders); a dynamic and ever changing technology arena which include some major trends like 4 G networks going to 5 G networks as well as a host of individual; ever changing technologies for individual applications; need to vet, integrate, install, and service the ultimate and ever changing array of technologies so that the "Best of Breed Technologies" can be delivered today and tomorrow to insure long term profitability and viability; a need for long lasting, cost effective, durable. hollow utility and street lamp poles which provide the configured (and re-configured) housing/base for the technologies and transmission capability that serve the public while generating the income streams to support the systems and enhance income while generating new revenue streams for the stake holders; and a diverse array of demographic profiles and market conditions exist within the service area which must be assessed and then efficiently matched with the integrated installations to generate the income stream capabilities to insure maximum coverage with the collective services in the most efficient manner possible.

Several technologies that are compatible with several exemplary embodiments of the present invention comprise: Secure Wired & Wireless IT Infrastructure, Fiber-Optic, Coax, Ethernet and Low Voltage Cabling, LAN/WAN, Routers, Switches, Firewalls, Gateways, 802.11a/g/n/ac WiFi, Mesh, & PTP/PTMP Wireless Bridging (Licensed & Unlicensed Spectrums), Location Based Services (GPS & WiFi), RFID (Passive & Active), Biometric Readers (such as in embodiments with signage or parking meters or other interfaces), Secure Analog/Digital & IP Video Surveillance Cameras & Management, Visible & Covert, Fixed Position & PTZ Camera Solutions, Long Range, High Resolution, Low Light, IR, Thermal & Edge Analytics Camera Options, Centralized Command & Control Camera Management Software, Secure (US Federal TS approved) Surveillance Camera & Management Software Solutions, Advanced Camera Analytic Solutions w/Custom Logical Rule Capabilities, Facial, Object, License Plate Recognition, People & Vehicle Counting, Abandoned & Removed Object Detection, Directional Detection, Drone (UAV) Perimeter Security Solution, Gunshot detection, Voice Recognition, Tornado and high velocity wind and weather detection, emergency service call and request access. Also: energy efficient lighting to save OPEX, a private WiFi network to support smart parking meter and utility meter reading without the need to dispatch truck rolls, a Police Department deployment of a high speed 1st responder network that interfaces with patrol vehicle in-car video systems and the officer's body cameras, enhanced 5 G multi-carrier cellular integration.

According to an aspect, one exemplary plan for implementation/installation of an embodiment of the invention comprises: design and test at a beta site to be representative/characteristic of a larger service area shall be quantified and mapped so that the demographics and potential of the relevant service areas can be most efficiently related. Then, all of the technologies which may have relevance to each market segment are reviewed so that the Best of Breed Technologies can be developed, incorporated, and maintained. From the prioritized areas, the appropriate poles are identified/developed to insure functionality, maintenance, and endurance. Modifications for maintenance would include street level access panels, and internal fixtures with ease of access. Aesthetics for poles can be addressed by incorporating a variety of designed roto cast exterior "sleeves" which can be placed over the "base technical pole".

Further steps and considerations include: Identify where solar, wind, and batteries would be desirable as they may apply. Identify the immediate service providers and commercial users to each pole or grid or site or neighborhood. Identify for energy providers where implementation can provide cost savings. Identify sites suitable for facial recognition and which entities would benefit from access to such data. Select cities and sites that could best benefit from the cumulative efficacy of the combined technologies, i.e. first responders, facial recognition, heightened lighting, added Internet connectivity and speed, drive down advertisements, etc.

One exemplary pultruded utility pole has a 10 inch OD with 0.25 inch wall thickness and is constructed as described above. This geometry might be described as "structurally efficient" in comparison to a solid wooden utility pole intended for the same purpose. This pole is particularly acceptable because it excessed a deflection of 1.9 m and cantilever load of 9.2 kN. For the geometry and boundary conditions used, this implies a flexural strength of 324 MPa (47,000 psi) and this value has been used as a benchmark to establish a family of products which are useful for exemplary but nonlimiting contemplated embodiments of the present invention.

What such poles do particularly very well is to increase the shear strength and stiffness in between the regions of the cylinder subjected to tension and compression. The improved shear modulus, in particular, will reduce the non-linearity experienced such that predicted deflections will be closer to test. A change to such off-axis construction will also improve bolt bearing strength for closure panels and other attachments. Finally, the incorporation of closure panels/inserts and other modifications to the base in fully engineered pole will also stiffen this region making deflections closer to the linear prediction. Several other contemplated sizes studied and contemplated are those having 10 and 12 inch outer diameters, with a wall thickness of 0.25 and 0.75 inches.

Figures 10A, 10B, 10C:
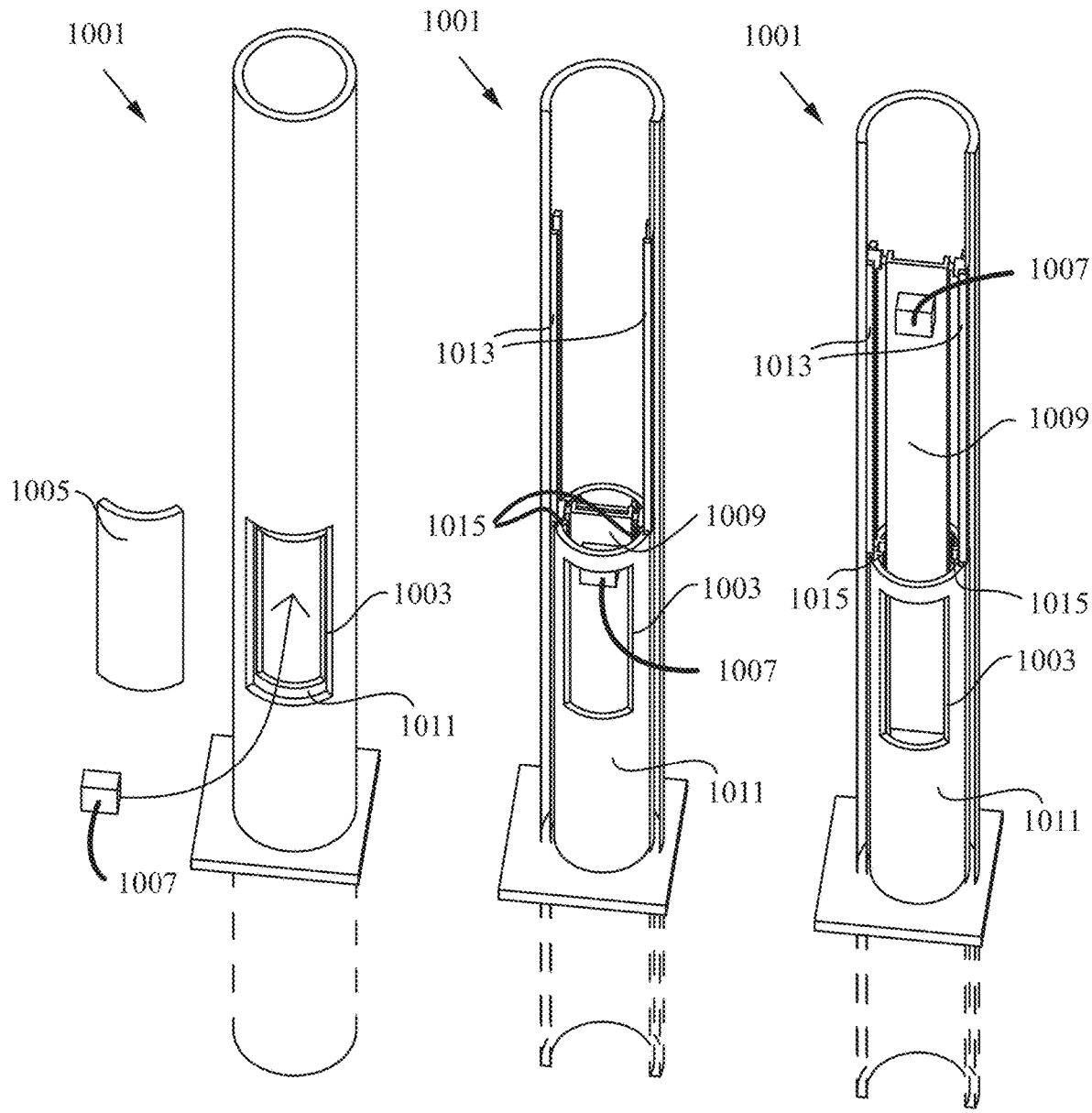
FIG. 10A shows a high perspective view of an exemplary rail and sliding mounting plate embodiment of the present invention with a hatch aperture open.
FIG. 10B shows a section view of an exemplary rail and sliding mounting plate embodiment of the present invention with the plate in its lowest position.
FIG. 10C shows a section view of an exemplary rail and sliding mounting plate embodiment of the present invention with the plate in its highest position.

FIGS. 10A-C show a high perspective view of an exemplary rail and sliding mounting plate—equipped pole (1001) embodiment of the present invention.

In FIG. 10A, a lineman or network engineer or other workman can open the conveniently large (3 feet tall) and ergonomically located (top edge at 6' from the ground) hatch aperture (1003) by opening the cover aperture (1005). He can then bring a device (1007) to install into the pole (1001), via the hatch aperture (1005), directly from a position standing at the aperture.

In FIG. 10B, a section view of a similar pole (1001), the sliding mounting plate (1009) is in its lowest position, and the device (1007) is installed near the top of the plate (1009), and is directly accessible at this height through the aperture (1003), to a workman standing at the aperture (1003).

In FIG. 10C, the plate (1009) has been elevated to its highest position. Because the plate (1009) is 6 feet tall, the device (1007) is nearly at 12 feet from the ground. However, the device (1007) can be returned to the position of FIG. 10B by a workman standing at the aperture (1003), by lowering the plate (1009), which is an access feature.

Also shown in FIGS. 10A-C are features specific to this exemplary embodiment, comprising a reinforcing liner (1011) which extends to the ground (see also liners in FIGS. 11 and 12), a multiple rail system comprising rails (1013) and (1015), respectively located above and within the liner (1011).

Figure 11:
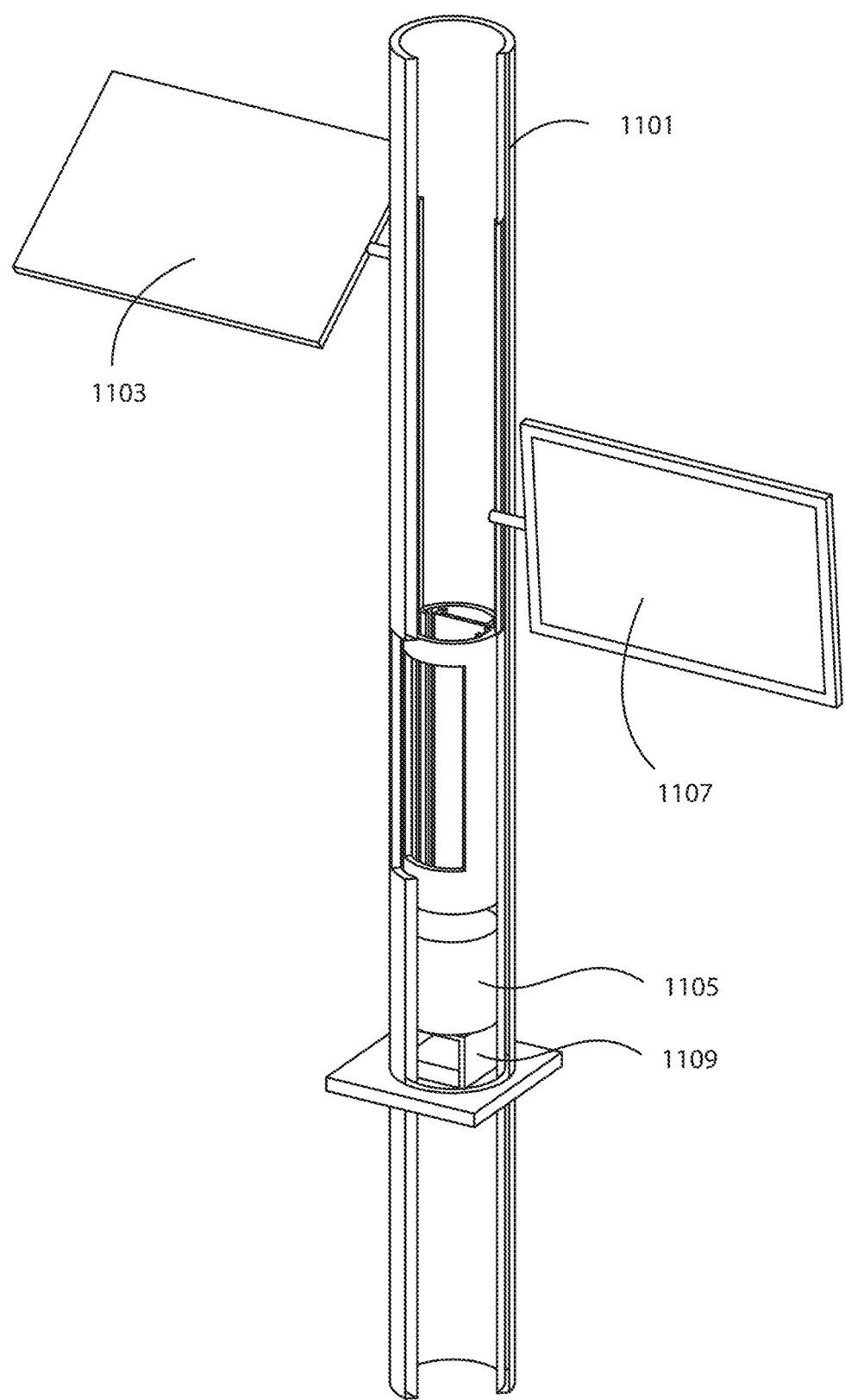
FIG. 11 shows a section view of an exemplary rail solar generating battery backup and digital signage embodiment of the present invention.

FIG. 11 shows a section view of an exemplary rail and sliding-plate-equipped embodiment of the present invention with a pole (1101) that is similar to the pole (1001) shown in FIGS. 10A-C, further comprising solar energy generating solar cells (1103), battery backup (1105) on a fixed battery support/tray (1109) and digital signage (1107).

Figure 12A:
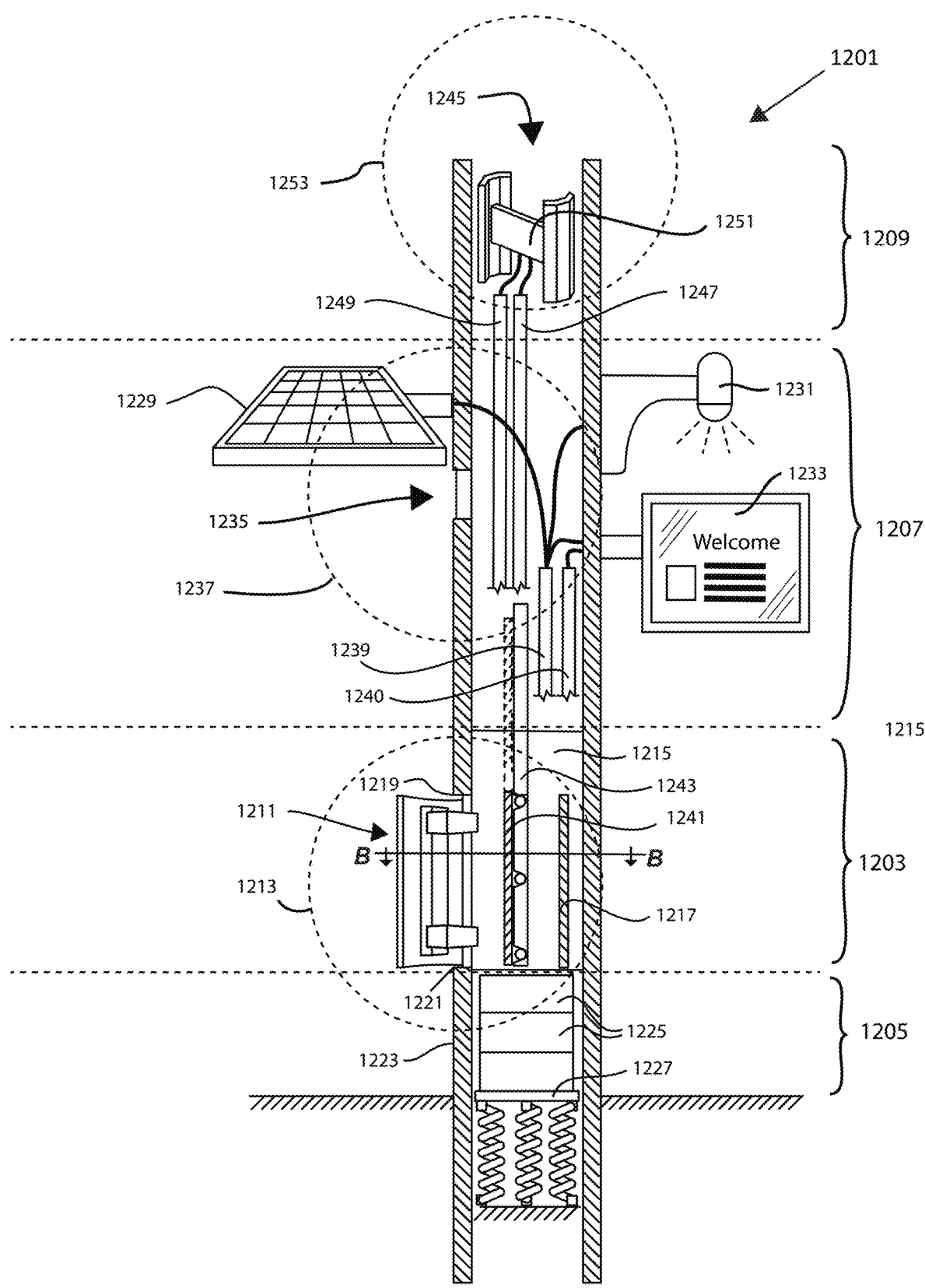
FIG. 12A shows a section elevation view of an exemplary pole embodiment of the present invention.

FIG. 12A shows a section elevation view of an exemplary pole (1201) embodiment of the present invention that is similar to poles in several other figures, and comprising features and components found in several other figures, which will be indicated accordingly. The pole (1201) comprises an interior defining a plurality of regions for electronic components and several access features. The regions include a core region (1203), a sub core region (1205), a utilities region (1207), and an antenna region (1209).

With respect to the core region 1203, it is characterized by a hatch aperture 1211 that provides access to the interior of the pole 1201. Similar to hatch 1003 of FIGS. 10A-C, the aperture 1211 is defined by an upper aperture edge 1219 and a lower aperture edge 1221. The hatch aperture 1221 shown here is merely exemplary in position and proportions and should not be limiting on other similar embodiments. The lower aperture edge 1221 is 3 feet from the ground, and the upper aperture edge 1219 is 6 feet from the ground, thereby providing a 3 foot tall unimpeded height for directly reaching into the pole 1201. Because of the size of the aperture, this hatch aperture 1211 thereby provides to a workman standing at the aperture 1211 a direct access range 1213 (indicated by the dotted circle labeled 1213). The upper bound of the range 1213 is approximately the height of the core region 1203.

The core region 1203 includes a reinforcing liner 1215 similar to liner 1011 of FIGS. 10A-C. Liner 1215 circumferentially surrounds the interior of the core region 1203, reinforcing the pole 1201 against bending forces, to compensate for the large size of the hatch aperture 1211. In other exemplary embodiments, equivalents to liner 1215 are configured to extend to the ground (see liner 1011, FIG. 10), or further, such as to the base of the pole 1201, such as in the case of a partially buried pole (501, FIG. 5) or an embedded pole (see FIGS. 7A-B), as desired or necessary to provide desirably high bending strength as otherwise possible with the pole formulation and proportions, stated in other sections, above.

With respect to the sub-core region 1205, it is characterized by an enclosed base region 1223 extending between approximately ground-level and the lower aperture edge 1221. Here, sub core region 1205 provides storage for batteries, similar to region 931 of FIG. 9, in which there are a plurality of batteries 1225, similar to the battery backup (1105) shown in in FIG. 11. While the range of direct access 1213 of the core region 1203 allows for reaching the top layer of the batteries 1225, the batteries 1225 in the sub core region 1205 are provided in a capacity that makes the entire height of the batteries 1225 extend well below the range of direct access 1213.

Specifically as to the embodiment shown here, but not necessary to all other contemplated embodiments that may otherwise be similar to this pole 1201, The range of direct access 1213 includes reach to the top layer of the batteries 1225, but does not include reach for the entire layer below the top layer. The batteries 1225 are therefore inaccessible components of the sub core region 1205, rather than directly accessible components of the core region 1203.

To provide a workman at an aperture in a first region, the hatch aperture 1211 of the core region 1203, with an access feature for accessing the otherwise inaccessible components of a second region, the batteries 1225 of the sub core region 1205, the batteries 1225 are supported on a battery tray/sprung platform 1227 (as opposed to the fixed platform 1109 under the battery 1105 of FIG. 11).

Here, the sprung platform 1227 is configured for an intended battery size and composition. The footprint area of each of the batteries determines the number of batteries that can be arranged as a layer on the platform 1227. The weight of each of the batteries determines the weight of the layer. The height of the batteries 1225 determines the height of a layer, and therefore how far down the batteries would extend below the lower edge of the aperture 1221, where the topmost layer is approximately the height of the lower edge 1221. Therefore, the cumulative spring rate for displacing the sprung platform 1227 is configured to allow sprung resistance against the weight of the platform and layer to a displacement approximately equal to the height of the layer under the load of the weight of the layer.

Therefore, the access feature, here, comprises a battery support tray 1227 in the sub-core region 1205 that is configured to maintain direct access 1213, to a workman at the aperture 1211, to the batteries 1225, as they are installed into the sub-core region 1205, by the tray 1227 being configured to receive layers of batteries 1225 having a layer height and layer weight, and descend a distance equal to the layer height as the batteries are installed, to an amount that reaches the layer weight. Essentially, this access feature allows each layer to be accessible while the batteries are loaded for each layer, as well as while the batteries are unloaded, in the case of removing such batteries.

The sprung platform 1227 shown comprises a plurality of springs distributed about the periphery of the platform 1227, within the interior of the pole 1201. The sprung platform 1227 shown is also supported at a lower surface which is below ground level, but this arrangement should be considered nonlimiting upon the invention as to other embodiments of the present inventions comprising battery storage, battery trays, sprung battery trays, and descending battery trays (see also the height of the fixed support 1109 of the battery 1105 in FIG. 11, which is above the surface of the ground).

Returning now to the core region 1203, the direct access range 1213 includes reach to a fixed back panel 1217, similar to panel 505 of FIG. 5, configured to support a core component set (not shown, see 509, FIG. 5; also FIG. 12B) thereon. Here, the fixed back panel 1217 extends at least the entire height of the range of direct access 1213, but other contemplated embodiments also comprise ones in which the fixed back panel 1217 is configured to extend the entire height of the liner 1215, or commensurately as desired for maximum space for installation of components into the core region 1203, stiffness of the pole 1201, and/or providing access to components which may extend through or into the core region 1203.

For example, here, the liner 1215 is shown as terminating at the top of the batteries 1225. In the case of an embodiment having a liner which extends to the ground (see liner 1011, FIGS. 10A-C), terminating the bottom edge of the back panel 1217 proximate the height of the lower aperture edge 1221 (rather than extending to the ground), allows for the batteries 1225 to extend across the interior, rather than merely as far as the back panel 1217 is offset, across the interior of the pole 1201, from the aperture 1211. Alternatively, terminating the bottom edge of the back panel 1217 to such a height, or terminating the top of the back panel 1217 to a height lower than the top edge of the liner 1215 allows for some improved access to components and access features that may otherwise be routed behind the panel, such as power and data conduits, further explained below.

The utilities region 1207 extends upward from the top edge of the core region 1203. With respect to the utilities region 1207, in the present embodiment, it is characterized by being configured to support at least a plurality of components related to functions of the pole which affect the areas immediately proximate to the site of the pole 1201. It is not incompatible with providing support for networking and inter-pole equipment (see 917, 919, 913, FIG. 9), though such components are not shown in this embodiment.

In particular, what are shown are power generation solar cells 1229 (similar to 905, FIG. 9; 1103, FIG. 11, and "solar panel," FIG. 8A), a lamp 1231 (similar to 911, FIG. 9), and digital signage 1233. Here, the pole 1201 comprises an aperture 1235 proximate to the utilities region that provides a workman accessing the utilities region 1207 with range of direct access 1237 (shown by dotted circle 1237) into the utilities region 1207 that affords direct access reach to the parts of the interior of the pole 1201 where these utilities region components (1229, 1231, 1233) are supported and connected for data and power.

The particular components (1229, 1231, and 1233) in the utilities region all connect to a source of power available to the pole 1201 that is fed to the utilities region 1207 from the bottom of the pole, either grid power (not shown, see 933, FIG. 9) or the batteries 1225, as well as a connection for data. These sources of power, and grid data (not shown, see 935, FIG. 9), are located in the sub- core region 1205, and are inaccessible to the range of direct access 1237, without an access feature.

To provide a workman at an aperture in a first region, the aperture 1235 of the utilities region 1207, with an access feature for accessing the otherwise inaccessible components of a second region, here, the batteries 1225 (or grid power and data, not shown) of the sub core region 1205, there is a plurality of conduits, including a utilities region power conduit 1239 and utilities region data conduit 1240 (similar to the conduit interfaces 533, FIG. 5).

Here, the conduits 1239, 1240 extend between a first position at the bottom of the pole 1201 and a second position in the utilities region 1207, such that an electrical connection can be run inside the conduits 1239, 1240 from the first position to the second position in the utilities region 1207 and accessed by a workman at the aperture accessing the utilities region within the range of direct access 1237 to connect the electrical connection to the components 1229, 1231, 1233 of the utilities region 1237, the power generation solar cells 1229, the lamp 1231, and the digital signage 1233. This embodiment should not be construed as limiting upon other electronics components that are otherwise suitable for installation into the utilities region 1207. Some are: cameras, audio detectors, weather sensors, wind generators, and external and internal antennas.

The utilities region, apart from the conduits 1239, 1240 and the associated electrical wiring that extends to the components 1229, 1231, 1233, appears substantially empty. However, the utilities region also comprises a sliding panel 1241 (see also FIGS. 6; 1001, FIGS. 10A-C; and FIG. 11). This panel/plate 1241 is configured to receive electrical components that can be stored within the utilities region 1207 (not shown here, see 1007, FIGS. 10A-C), but they would be substantially out of the reach of the range of direct access 1237. These components are therefore inaccessible from the utilities region 1207, without an access feature.

However, as these components are for storage within a first region, the utilities region 1207, a workman can be provided an access feature from an aperture in a second region, the core region 1203. Therefore, changing perspective to the components being accessible from the core region 1203:

To provide a workman at an aperture in a first region, the aperture 1211 of the core region 1203, with an access feature for accessing the otherwise inaccessible components of a second region, here, the electronics components (not shown, see 1007, FIGS. 10A-C) of the utilities region 1207, there is a utilities components access rail 1243.

The rail 1243, in combination with the sliding panel 1241, provides a rail system extending along the length of the pole 1201, such that the sliding panel/mounting plate 1241 is vertically translatable within the pole 1201, between the utilities region 1207 and the core region 1203, the lower edge of the panel 1241 being alternately locatable throughout a distance along the length of the pole 1201, between the bottom of the core region 1203 to the top of the lining 1217, proximate the edges of the reach provided by the range of direct access 1213 for a workman standing at the hatch aperture 1211.

Stated another way, in FIG. 12A, the aperture is proximate the core region 1203 and the access feature comprises a plate 1241 that is alternately positionable to a first position in the utilities region 1207 and a second position in the core region 1203 of the pole, such that the electronics components (1007, FIGS. 10A-C) of the utilities region 1207 can be accessed by a workman at the aperture 1211 to install or service the components of the utilities region 1207 when the plate 1241 is at the second position.

This specific embodiment of a rail system should be considered nonlimiting on other contemplated embodiments. Others provide a multiple rail system (See 1013 and 1015, FIGS. 10B,C), ones having a continuous rail or cooperative rail system, such as embodiments which provide a rail (or channel) along the length of the lining 1215 as well as a rail which extends vertically from the top of the lining 1215 (into the utilities region), and ones in which carriages or mounting plates are installed with respect to said rails. One exemplary embodiment of a continuous rail is shown in FIG. 6. There, a mounting plate 603 is configured to be vertically translatable within a rail 607. For a pole in which the rail might be installed the lower edge of the plate 603 would thereby be alternately locatable throughout a distance along the length of such a pole, between the bottom of the pole and the top of a lining terminating proximate 6 feet from the ground.

Referring back to FIG. 12A, the antenna region 1209 extends upward from the top edge of the utilities region 1207. With respect to the antenna region 1209, in the present embodiment, it is characterized by being configured to support at least a wireless communications antenna, and specifically, a directional wireless communications antenna 1251, similar to 907 and 909 of FIG. 9, that is configured to pole-to-pole communications. The antenna region 1209 is not incompatible with providing support for networking and inter-pole equipment (see 917, 919, 913, FIG. 9), nor other components otherwise listed here and above, such as those detailed with respect to the utilities region 1207, above, though such components are not shown in this embodiment.

Here, the pole 1201 comprises an aperture by an open cap 1245 (cap not shown) on the top of the pole 1201 that provides a workman accessing the antenna region 1209 with range of direct access 1253 (shown by dotted circle 1253) into the antenna region 1209 that affords direct access reach to the parts of the interior of the pole 1201 where these antenna region components (antenna 1251) are supported and connected for data and power.

The particular components (antenna 1251) in the antenna region 1209 all connect to a source of power available to the pole 1201 that is fed to the utilities region 1209 from the bottom of the pole, either grid power (not shown, see 933, FIG. 9) or the batteries 1225, as well as a connection for data. These sources of power, and grid data (not shown, see 935, FIG. 9), are located in the sub-core region 1205, and are inaccessible to the range of direct access 1253, without an access feature.

To provide a workman at an aperture in a first region, the open-cap-aperture 1245 of the antenna region 1209, with an access feature for accessing the otherwise inaccessible components of a second region, here, the batteries 1225 (or grid power and data, not shown) of the sub core region 1205, there is a plurality of conduits, including an antenna region power conduit 1247 and utilities region data conduit 1249 (similar to the conduit interfaces 533, FIG. 5; also conduits 1239 and 1240 of the utilities region 1207).

Here, the conduits 1247, 1249 extend between a first position (not shown) at the bottom of the pole 1201 and a second position in the antenna region 1209, such that an electrical connection can be run inside the conduits 1247, 1249 from the first position to the second position in the antenna region 1209 and accessed by a workman at the aperture 1245 accessing the antenna region 1209 within the range of direct access 1253 to connect the electrical connection to the components of the antenna region 1209, the antenna 1251.

Figure 12B:
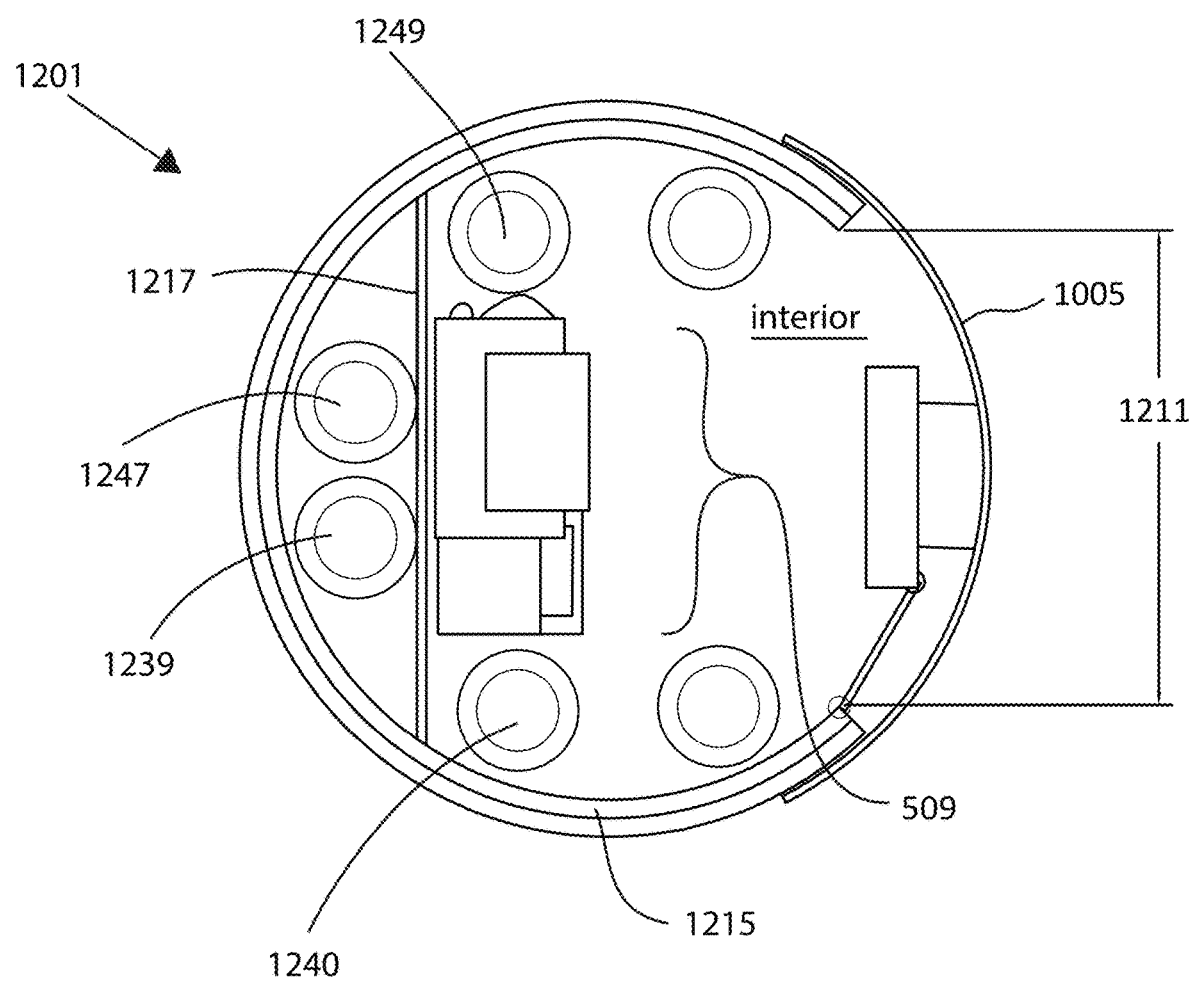
FIG. 12B shows a top section view of an exemplary pole embodiment of the present invention, at a height within a core region of the interior of the pole.

Referring now to FIG. 12B, what is shown is a top section view of the pole 1201 at a height within the core region 1203, between the top edge (1219, FIG. 12A) and bottom edge (1221, FIG. 12A) of the hatch aperture 1211. The hatch aperture 1211 is shown closed, with cover 1005 enclosing the pole exterior. Within the pole 1201, there is the liner 1215, and several conduits. Here, the conduits include at least two conduits for utilities region data (1240) and utilities region power (1239), as well as two conduits for antenna region data (1249) and antenna region power (1247). The fixed backing plate 1217 is shown supporting common core components 509.

I claim:

1. An apparatus, comprising:
    a pole having an interior;
    the interior comprising plural regions for electronics components;
    a first aperture;
    the regions comprising an antenna region, a utility region, a core region, and a sub-core region; and
    an individuated region access feature having a first position and a second position,
    wherein the electronics of a region are alternately accessible at the first position of the feature and inaccessible at the second position of the feature, and
    wherein the aperture is proximate the core region and the access feature comprises a plate that is alternately positionable to a first position in the utilities region and a second position in the core region of the pole, such that the electronics components of the utilities region can be accessed by a workman at the aperture to install or service the components of the utilities region when the plate is at the second position, and
    wherein the plate is configured to be lowered at the first position by a workman standing at the aperture, reaching into the core region of the pole by grasping one of a plate handle and the plate, proximate the utilities region, and moved by the direct access range of movement of the workman, while standing at the aperture, until it is lowered to the second position, at which the plate is configured to receive a device and for the device to be installed onto the plate, and the plate being further configured to be returned to the first position by the workman standing at the aperture, reaching into the core region of the pole, by grasping a plate handle and, and moved by the direct range of movement of the workman, while standing at the aperture to be raised to the first position.

2. The apparatus of claim 1, wherein: the pole is a first pole, and further comprising:
    an additional pole that is similar to the first pole, the additional pole being a second pole; and
    the antenna regions of the poles comprising directional antennas being configured to wireless communication between the first and second poles.

3. The apparatus of claim 2, and further comprising an additional pole that is a third pole; and
    the second pole further comprising a second directional antenna configured to wireless communication between the second and third poles,
    such that the second pole is an inner pole and the first, second, and third poles form a wireless network.

4. The apparatus of claim 3, and further comprising an additional pole that is a fourth pole that comprises a first directional antenna in directional communication with the first pole and a second directional antenna is in directional communication with the third pole, such that the fourth pole is an inner pole, and such that the network is configured to alternate paths of directional wireless communications between the first pole and the fourth pole.

5. The apparatus of claim 2, wherein the poles each comprise an omnidirectional antenna for communicating data to wireless devices proximate to the particular pole, such that a wireless device in connection to a particular omnidirectional antenna can access data available at another pole.

6. The apparatus of claim 5, wherein the poles are configured to facilitating autonomous driving networks, vehicle tracking, and mobile device tracking.

7. The apparatus of claim 5, wherein the first pole comprises an omnidirectional antenna for communicating data to external electronic communications networks, such that a device in communication with either of the poles can communicate to the external communications networks.

8. The apparatus of claim 5, wherein the first pole comprises access to a ground connection for communicating data to external electronics communications networks, such that a device in communication with either of the poles can communicate to the ground communications networks.

9. The apparatus of claim 8, further comprising an aperture proximate the antenna region and comprising a conduit extending between a first position at the bottom of the pole, through the sub-core region, core region, and the utilities region, and a second position in the antenna region, such that electrical connection can be run inside the conduit from the first position to the second position and accessed by a workman at the antenna region aperture accessing the antenna region to connect the electrical connection to an antenna.

10. The apparatus of claim 5, and further comprising a responder network configured to locate a site requiring response by comparative signal strength and change in signal strength relative to the particular poles.

11. The apparatus of claim 5, and further comprising at least one of call stations, parking meters, and energy/charging access points located with respect to one of installation to the pole or in directional communication with an antenna of one of the poles, such that the apparatus provides a secure directional-wireless-reporting-network.

12. The apparatus of claim 2, the poles further being in energy transmissive connection to grid power and configured to monitor and meter energy usage for the particular pole and communicate the data of energy usage to the other pole, and further comprising a battery configured to store energy to alternately store power at the particular pole and deliver power to the grid, to at least one of balance energy usage of the grid, with respect to alternately storing adequate energy for the demands of the particular pole, and assisting the grid as necessary to meet fluctuations in demand for energy in locations on the grid that are proximate to a particular pole.

13. The apparatus of claim 12, wherein at least one of the poles comprises energy generation electronics components to supplement energy storage and balancing at the particular pole, one selected from a list comprising solar cells and wind generators, and is configured to consider solar and wind energy production to monitor and respond to demand for energy.

14. The apparatus of claim 12, wherein the access feature comprises a battery support tray in the sub-core region configured to maintain direct access, proximate the core region, to a workman standing at the aperture outside the pole and reaching into the core region to the batteries, as they are installed to the sub-core region by the workman standing at the aperture by the tray being configured to receive layers of batteries having a layer height and layer weight and the battery tray being configured to vertical deflection within the interior of the pole according to support by comprising at least one spring supporting the tray that provides a predetermined amount of continuous distance deflection resistance, such that, per layer of batteries provided to the tray by the workman adding the batteries through the aperture, and receiving the layer weight to the tray, the battery tray descends within the sub-core region a height approximately equal to the layer height of the layer, and the tray further being configured to automatically ascend within the sub-core region a height approximately equal to the layer height of the layer, as the layer weight is removed, from the try per layer of batteries removed from the tray by the workman standing at the aperture and reaching into the core region, through the same aperture in the core region.

15. The apparatus of claim 14, wherein the tray is supported proximate the edges of the tray with springs distributed about the periphery of the interior of the sub-core region of the pole.

16. The apparatus of claim 1, further comprising an aperture proximate the utilities region and a conduit extending between a first position at the bottom of the pole, through the sub-core region and core region, and a second position in the utilities region, such that an electrical connection can be run inside the conduit from the first position to the second position and accessed by a workman at the utilities aperture accessing the utilities region to connect the electrical connection to components configured to function at locations in the utilities region that are outside of the direct access range of movement of a workman at the aperture of the core region, comprising electronics components from a list comprising: external lighting, cameras, audio detectors, digital signage, weather sensors, solar and wind generators, and external and internal antennas.

17. The apparatus of claim 1, wherein the plate is a first plate, and the pole comprises a second plate that is configured to receive electronics components in the core region and have installed thereon, such that they are installed to the core region and are alternately accessible to install or service to the direct access range of movement of a workman outside the pole, standing at the aperture of the core region, when the first plate is at the first position, and inaccessible to install or service to the direct access range of movement of a workman outside the pole, standing at the aperture of the core region when the first plate is at the second position.

18. An apparatus, comprising:
a pole having an interior;
the interior comprising plural regions for electronics components;
a first aperture;
the regions comprising an antenna region, a utility region, a core region, and a sub-core region; and
an individuated region access feature having a first position and a second position,
wherein the electronics of a region are alternately accessible at the first position of the feature and inaccessible at the second position of the feature,
wherein the access feature comprises a battery support tray in the sub-core region configured to maintain direct access, proximate the core region, to a workman standing at the aperture outside the pole and reaching into the core region to the batteries, as they are installed to the sub-core region by the workman standing at the aperture by the tray being configured to receive layers of batteries having a layer height and layer weight and the battery tray being configured to vertical deflection within the interior of the pole according to support by comprising at least one spring supporting the tray that provides a predetermined amount of continuous distance deflection resistance, such that, per layer of batteries provided to the tray by the workman adding the batteries through the aperture, and receiving the layer weight to the tray, the battery tray descends within the sub-core region, from the first position, proximate the core region, a height approximately equal to the layer height of the layer, to the second position, and
the tray further being configured to automatically ascend within the sub-core region from the second position to the first position, a height approximately equal to the layer height of the layer, as the layer weight is removed, from the tray per layer of batteries removed from the tray by the workman standing at the aperture and reaching into the core region, through the same aperture in the core region.

* * * * *